(12) United States Patent  (10) Patent No.: US 7,821,715 B2
Suzuki et al.  (45) Date of Patent: Oct. 26, 2010

(54) DIFFRACTIVE OPTICAL ELEMENT

(75) Inventors: Kenzaburo Suzuki, Yokohama (JP);
Akiko Miyakawa, Sagamihara (JP)

(73) Assignee: Nikon Corporation, Tokyo (JP)

( * ) Notice: Subject to any disclaimer, the term of this patent is extended or adjusted under 35 U.S.C. 154(b) by 382 days.

(21) Appl. No.: 11/816,903

(22) PCT Filed: Feb. 8, 2006

(86) PCT No.: PCT/JP2006/302573
§ 371 (c)(1),
(2), (4) Date: Aug. 22, 2007

(87) PCT Pub. No.: WO2006/090614
PCT Pub. Date: Aug. 31, 2006

(65) Prior Publication Data
US 2009/0052040 A1  Feb. 26, 2009

(30) Foreign Application Priority Data
Feb. 22, 2005 (JP) .............................. 2005-045199

(51) Int. Cl.
*G02B 5/18* (2006.01)
(52) U.S. Cl. ...................................................... 359/576
(58) Field of Classification Search ................. 359/576, 359/742

See application file for complete search history.

(56) References Cited

U.S. PATENT DOCUMENTS

| 5,847,877 | A | 12/1998 | Imamura et al. | |
|---|---|---|---|---|
| 2001/0013975 | A1 | 8/2001 | Nakai | |
| 2003/0161044 | A1 | 8/2003 | Tokoyoda | |
| 2005/0014088 | A1* | 1/2005 | Nakamura et al. | 430/270.1 |
| 2005/0018299 | A1 | 1/2005 | Tokoyoda et al. | |

FOREIGN PATENT DOCUMENTS

| JP | 8-160212 | 6/1996 |
|---|---|---|
| JP | 10-206785 | 8/1998 |
| JP | 2001-4955 | 1/2001 |
| JP | 2003-262713 | 9/2003 |
| JP | 2004-157404 | 6/2004 |

OTHER PUBLICATIONS

"Introduction to Diffractive Optical Elements", edited by The Optical Society of Japan, Japan Society of Applied Physics, First Edition, May 1997, pp. 7-14, 30-35, 117-125, English Translation Only.

* cited by examiner

*Primary Examiner*—Alessandro Amari
(74) *Attorney, Agent, or Firm*—Miles & Stockbridge P.C.

(57) ABSTRACT

A diffractive optical element 10 is constituted by sandwiching and closely bonding first and second optical element components 13, 14 which have different refractive indices and are adhered via a relief pattern 20, between third and fourth optical element components 11, 12.

33 Claims, 14 Drawing Sheets

DIFFRACTIVE OPTICAL ELEMENT

FIELD OF THE INVENTION

The present invention relates to a diffractive optical element, and more particularly to a small, lightweight and high-performance diffractive optical element used in an observation optical system and/or an imaging optical system.

BACKGROUND OF THE INVENTION

Depending on the intended application, there is an ongoing demand for smaller and lighter optical systems such as those used, for instance, in image display devices worn by an observer on his/her head (including the face), or in small cameras installed in mobile phones. There is also a progression towards higher pixel counts in imaging elements, as a result of high-image quality requirements, all of which is very demanding in terms of lens performance. The use of diffractive optical elements is one known means for meeting such requirements.

Basically, a diffraction grating is an optical element manufactured to have a grating structure with several hundreds of fine equidistant slits or grooves within a small gap (about 1 mm), such that when light strikes the grating, a diffraction beam is generated in a direction determined by the pitch (spacing) of the slits or grooves and by the wavelength of the light. The present invention aims at providing an optical element having an effect identical to that of such diffraction gratings, which are used in spectrometers and the like, and at applying the optical element in observation optical systems and/or imaging optical systems.

As these diffractive optical elements there have been proposed, in recent years, so-called multilayer diffractive optical elements. These diffractive optical elements, where plural diffraction element components having a saw-tooth shaped relief pattern are stacked on one another, allow ensuring high diffraction efficiency across most of a desired wide wavelength region (for instance, the visible region), i.e. they possess a good wavelength characteristic. Ordinary such multilayer diffractive optical elements include, for instance, so-called bonded-multilayer diffractive optical elements that comprise two diffractive element components of mutually different materials, bonded to each other, with an identical relief pattern (as described in, for instance, Japanese Unexamined Patent Application Laid-open No. H09-127321).

Such a manufacturing method involves dripping an UV-curable resin, using a dispenser, onto a glass substrate where a relief pattern is formed. An UV-curable resin layer is then sandwiched between a third mold and the glass substrate, and thereafter UV radiation is irradiated to the UV-curable resin layer through the glass substrate, to cure the UV-curable resin. Demolding from the third mold yields then a diffractive optical element comprising the glass substrate and the UV-curable resin layer, with a relief pattern formed on the boundary surface thereof.

Despite the surface of the mold being flat, however, microscopic irregularities were apt to form on the surface of the UV-curable resin layer that is in contact with the surface of the mold. This was problematic in that formation of such irregularities on the surface of the UV-curable resin layer affected the optical characteristic of the diffractive optical element.

SUMMARY OF THE INVENTION

In light of the above problems, it is an object of the present invention to provide a diffractive optical element having good optical characteristics, easy to manufacture, and excellent in mass-productivity.

The diffractive optical element of the present invention comprises a first optical element component on which a relief pattern for generating a desired diffraction effect is formed; a second optical element component bonded to the surface of the first optical element component on which the relief pattern is formed; and a third optical element component bonded to a surface opposite the surface on which the second optical element component is bonded to the first optical element component, wherein the first and second optical element components comprise a relatively high refractive index and low dispersion material, and a relatively low refractive index and high dispersion material.

Preferably, the diffractive optical element of the present invention further comprises a fourth optical element component bonded to a surface opposite the surface on which the relief pattern of the first optical element component is formed.

Preferably, the third and fourth optical element components are refractive lenses having a curved surface shape of positive refractive power at the surfaces that are an interface with the environment.

Preferably, the diffractive optical element of the present invention satisfies the condition:

$L < dx$ wherein L is the optical length difference, along the optical axis direction, of the most phase-advanced and most phase-delayed portions of a wavefront after diffraction of a light beam passing through the relief pattern, and dx is the thickness of one of the first or second optical element components positioned at the exit of the relief pattern.

Preferably, the diffractive optical element of the present invention satisfies the condition:

$(d3+d4)/d < 0.5$ wherein d3 is the thickness of the first optical element component along the optical axis, d4 is the thickness of the second optical element component along the optical axis, and d is the sum of the thicknesses along the optical axis of the first, second, third and fourth optical element components.

Preferably, the diffractive optical element of the present invention satisfies the condition:

$0.00001 < P/f < 0.03$ wherein P is the minimum pitch of the relief pattern and f is the focal distance of the diffractive optical element.

Preferably, the third and fourth optical element components have positive refractive power, and the diffractive optical element of the present invention satisfies the condition:

$1.0 < fd/(f1 \cdot f2)^{1/2} < 20.0$ wherein f1 is the focal distance of the third optical element component, f2 is the focal distance of the fourth optical element component and fd is the inverse of the refractive power (focal distance) of the relief pattern.

Preferably, the diffractive optical element of the present invention satisfies the condition:

$0.03 < |\{(nd3-1)/vd3 - (nd4-1)/vd4\}/(nd3-nd4)| < 3.0$ wherein nd3 is the d-line refractive index of the first optical element component, nd4 is the d-line refractive index of the second optical element component, vd3 is the d-line Abbe number of the first optical element component and vd4 is the d-line Abbe number of the second optical element component.

In the present invention, preferably, an optical material forming the third optical element component comprises a refractive index that is closer to that of an optical material of the optical element component to be formed later, than to that of an optical material of the optical element component to be formed first, among the first and second optical element components.

In the present invention, preferably, the optical material forming the third and fourth optical element components is a resin, and the optical materials forming the first and second optical element components are UV-curable resins having mutually different refractive indices.

In the present invention, preferably, the third or fourth optical element components comprise the same resin material.

In the present invention, preferably, the surface closest to an object side and the surface closest to an image side have predetermined curvatures respectively, surfaces other than these surfaces have flat surfaces perpendicular to the optical axis, and the relief pattern is planarly formed perpendicular to the optical axis.

Also, an eyepiece optical system according to the present invention is an eyepiece system for forming a virtual image, comprising the above-described diffractive optical element.

According to the present invention, it is possible to realize a diffractive optical element, which is a small, lightweight and high-performance diffractive optical element suitable for use in an observation optical system and/or an imaging optical system, and which, in particular, provides satisfactory color aberration correction and image forming performance, the diffractive optical element being able to be easily manufactured while a manufacturing cost reduction can be achieved.

BRIEF DESCRIPTION OF THE DRAWINGS

FIG. 1 is a schematic cross-sectional diagram of a multilayer diffractive optical element, wherein

DESCRIPTION OF THE PREFERRED EMBODIMENTS

Figure 1A:
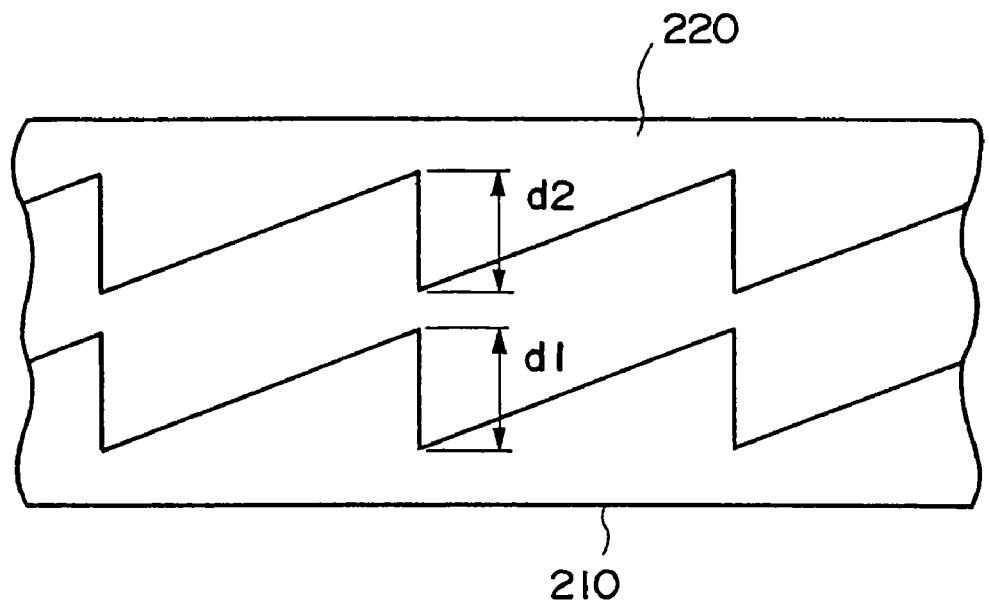
FIG. 1(a) is a schematic cross-sectional diagram of a non-bonded-multilayer diffractive optical element and FIG. 1(b) is a schematic cross-sectional diagram of a bonded-multilayer diffractive optical element.

There have been attempts to integrate diffractive optical surfaces into an optical system with a view of achieving better performance and further miniaturization that are unattainable with refractive optical systems and reflective optical systems, in, for instance, pickup lenses used in optical disks.

Here follows an explanation on diffractive optical surfaces and diffractive optical elements. There are three ordinary methods for bending light beams: refraction, reflection and diffraction. A diffractive optical surface is an optical surface having a diffractive effect on light. A diffractive optical element is an optical element comprising such a diffractive optical surface, conventional examples of which include, for instance, diffraction gratings and Fresnel zone plates. As is known, the behavior of such diffractive optical elements is different from refraction and reflection, and includes, specifically, negative dispersion. This property is extremely effective for correcting chromatic aberration. Herein, good chromatic aberration correction can only be achieved using expensive special low-dispersion glass (ordinary glass being ineffective). Further details on the characteristics of such diffractive optical elements can be found in "Introduction to Diffractive Optical Elements", edited by the Optical Society of Japan, The Japan Society of Applied Physics, First Edition, 1997. The diffractive optical surface data in the Examples are displayed in accordance with the notation of an ultrahigh refractive index method, the details of which can be found, likewise, in "Introduction to Diffractive Optical Elements", edited by the Optical Society of Japan, The Japan Society of Applied Physics, First Edition, 1997.

Such diffractive optical surfaces have a reverse wavelength characteristic vis-à-vis glass and/or ordinary lenses, in that their diffractive power increases the longer the wavelength is. Incorporating such diffractive optical surfaces into an optical system, therefore, affords extremely good chromatic aberration correction, as it becomes possible to correct chromatic aberration alone, independently from other aberrations. When used in observation optical systems, imaging optical systems and the like, the diffractive optical surfaces correct specifically chromatic aberration arising from a smaller lens count imposed by size reduction or the like, while other aberrations can be specifically corrected by respective surfaces other than the diffractive optical surfaces. This contributes, as a result, to reducing the size and the weight of the overall constitution.

Single-layer diffractive optical elements, however, are problematic in that light of a wavelength region deviating from the designed wavelength gives rise to flare, thereby impairing image quality and image-forming performance, and hence their use is restricted to a single wavelength or narrow wavelength region, for instance in laser beam sources.

Thus, so-called multilayer (or laminate-type) diffractive optical elements have been proposed in recent years. As explained above, such diffractive optical elements are obtained by stacking, in a bonded or decoupled form, plural diffractive element components having a relief pattern shaped as saw teeth and exhibiting different refractive indices and dispersions. These diffractive optical elements ensure high diffraction efficiency across virtually the entirety of a desired wide wavelength range (for instance, the visible region), i.e. they possess a good wavelength characteristic.

The structure of a multilayer diffractive optical element is explained next. Ordinarily, a multilayer diffractive optical element comprises, as illustrated in FIG. 1(a), a first optical element component 210 comprising a first material, and a second optical element component 220 comprising a second material having a refractive index and/or dispersion value different from that of the first material, such that the surfaces where the optical element components 210 and 220 face each other form a saw-tooth shaped relief pattern, as illustrated in the figure. The groove height d1 of the first optical element component 210 is set to a predetermined value, and the groove height d2 of the second optical element component 220 is set to another predetermined value, so as to satisfy an achromatic condition for a specific two-wavelength. A diffraction efficiency of 1.0 for two-wavelength, and also a fairly high diffraction efficiency for other wavelengths, are obtained as a result. In light-transmissive diffractive optical elements, diffraction efficiency is indicated by the ratio $\eta(=I1/I0)$, wherein I0 denotes the intensity of light incident on the diffractive optical element, and I1 denotes the intensity of the primary diffracted light.

The above decoupled multilayer diffractive optical element requires plural molds, since the heights d1 and d2 of the respective diffraction grating grooves of the first optical element component 210 and of the second optical element component 220, which constitute the diffractive optical element, are mutually different. Also, the first and second optical element components 210, 220, which are manufactured in separate but identical procedures using these molds, must be positioned relative to each other with great accuracy. The foregoing makes for extremely awkward production.

Figure 1B:
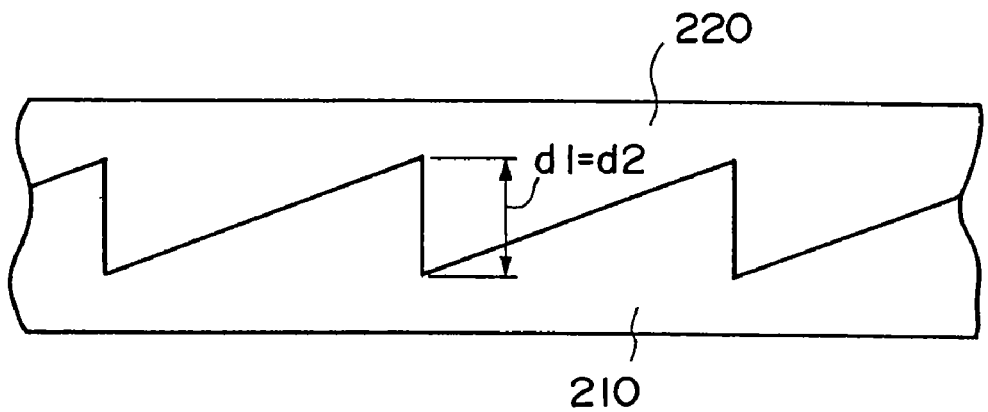

Thus, a bonded-type multilayer diffractive optical element has been proposed in which the groove height d1 of the first optical element component 210 and the groove height d2 of the second optical element component 220 are identical (FIG. 1(b)). In this bonded-type multilayer diffractive optical element, the error sensitivity (tolerance) of the height of the diffraction grating, and the error sensitivity (tolerance) of the roughness of the diffraction surfaces are less stringent than in a decoupled-type diffractive optical element. Such a bonded-type multilayer diffractive optical element is hence advantageous in terms of ease of manufacture and is highly suitable for mass-production, affording superior productivity. Such a diffractive optical element favors hence cost reductions in optical articles.

Figure 2:
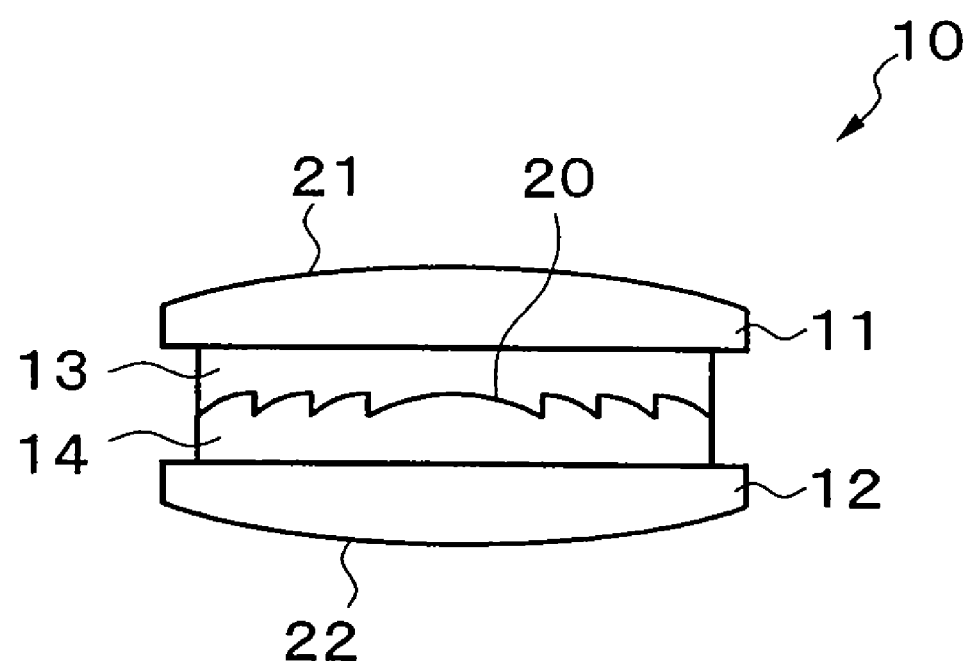
FIG. 2 is a schematic cross-sectional diagram of a diffractive optical element according to the present invention.

In the light of the foregoing, an embodiment of the present invention, as illustrated in FIG. 2, is a so-called bonded-multilayer diffractive optical element constituted by closely bonding first and second optical element components 13, 14, having different refractive indices and being bonded via a relief pattern, between third and fourth optical element components 11, 12. The present invention is not limited to such a constitution, and, for instance, the second optical element component 14 and the fourth optical element component 12 may be formed integrally, the first optical element component 13 may be bonded to the relief pattern 20 of the second optical element component 14, and the third optical element component 11 may be bonded onto the first optical element component 13. Also, layers formed of a material different from that of the various optical element components may be interposed at the bonding portions.

Thanks to the bonded-multilayer constitution, the present invention can be suitably used across virtually all wavelengths, and can be easily employed, for instance, in imaging lenses of photographic cameras that use wide-spectrum white light, and/or in eyepiece lenses that utilize the visible region. Also, sandwiching and bonding the first and second optical element components 13, 14 between the third and fourth optical element components 11, 12 allows protecting from the outer environment the relief pattern 20 formed on the bonding surface of the first and second optical element components 13, 14.

The diffractive optical element 10 in the embodiment of the present invention has preferably the above integrated solid-lens structure, which makes for increased robustness, less impairment of optical performance, and allows moreover reducing eccentricity and/or deformation during assembly of the diffractive optical element 10 into the optical system. The resulting compact structure, which can thus be manipulated as a single lens, contributes to shrinking the size of the optical system into which the diffractive optical element 10 is built.

In a conventional optical element, an irregular pattern appeared at the opposite side of the relief pattern forming side of the second optical element component 14, during formation of the second optical element component 14 on the first optical element component 13; in the present invention, however, this influence can be eliminated. That is because, in a conventional optical element, the irregular pattern forming side of the second optical element component 14 was an interface with air (environment), whereas in the present embodiment the second optical element component 14 is air-tight bonded to other optical element components. In other words, the surface of the second optical element component 14 opposite the relief pattern is formed through air-tight bonding, like the other optical element components, and hence the irregular pattern formation that occurred in conventional optical elements can be suppressed, eliminating thus the optical influence of such irregular pattern formation.

The inventors speculate that the reason for the formation of microscopic irregularities on the second optical element component 14 may be as follows. During formation of the relief pattern in the optical element component, there appears a minute curing unevenness upon curing of the resin. This gives rise to a strength distribution where internal stresses are not constant, which results in an irregular surface. Several factors are believed to be behind that unevenness, one of which appears to be that when an UV-curable resin is used for forming the second optical element component 14, the UV beams are diffracted and/or dispersed by the relief pattern during resin curing, thereby modifying the irradiation distribution and becoming thus a factor of curing unevenness upon curing.

If the diffractive optical element 10 is considered as a single lens, then this lens has convex power and positive dispersion, while the diffraction grating comprising the first and second optical element components 13, 14 has convex power and negative dispersion. The total amount of aberration relative to a baseline can thus be curbed as a result.

In the third and fourth optical element components 11, 12 it does not matter which is positive and which is negative, at any refractive power. The third and fourth optical element components 11, 12 need only be built within specifications, in accordance with design requirements, to afford suitable aberration correction. When the diffractive optical element 10 is used having an overall positive refractive power, both the third optical element component 11 and the fourth optical element component 12 have positive refractive power; when the diffraction surfaces have positive refractive power they have negative dispersion, and hence an optical element can be achieved having good achromatism as a whole. Conversely, when the diffractive optical element 10 is used having an overall negative refractive power, both the third optical element component 11 and the fourth optical element component 12 have negative refractive power; when the diffraction surfaces have negative refractive power they have positive dispersion, and hence an optical element can be achieved having good achromatism as a whole.

In this case, the bonding surfaces between the third and fourth optical element components 11, 12 and the diffraction grating that comprises the first and second optical element components 13, 14 are planar surfaces perpendicular to the optical axis, while the respective outer surfaces, i.e. the interfaces with the environment (external atmosphere) are shaped as curved surfaces, to achieve a predetermined refractive power.

Also, imparting refractive power in a same direction to both the third and fourth optical element components 11, 12 allows decreasing the amount of chromatic aberration occurring per refractive surface. It becomes therefore possible to reduce easily the amount of chromatic aberration, which is cancelled by the diffractive effect generated at the relief pattern forming surface, thereby reducing the amount of chromatic aberration that occurs in the optical element as a whole.

In the embodiment of the present invention, the thickness of the first and second optical element components 13, 14 along the optical axis is preferably smaller than the thickness of both the third and fourth optical element components 11, 12 along the optical axis. This is important in order to reduce the thickness of the entire optical element and to realize a compact, lightweight device. More specifically, the thickness of the first and second optical element components 13, 14 along the optical axis is preferably not larger than one third of the thickness along the optical axis of the thinnest component among the third and fourth optical element components 11, 12, and satisfies moreover the below-described condition (2). If the thickness of the first and second optical element components 13, 14 along the optical axis is too small, however, light may strike the next optical element component before interference, so that the desired effect cannot be achieved. Accordingly, it is preferable to thicken the optical length, along the optical axis direction, of the portions where phase is most advanced and most delayed, at the wavefront after diffraction of the light beam passing through the relief pattern formed on the interface between the first optical element component 13 and the second optical element component 14. If the present diffractive optical element is used in an eyepiece optical system, such thickness is preferably of at least 50 μm, to achieve diffracted light as designed.

In an embodiment of the present invention, the first and second optical element components 13, 14 must comprise optical materials having relatively high refractive index and low dispersion, and low refractive index and high dispersion. Either may be on the object side. This is an essential condition for realizing the bonded-multilayer constitution of the diffractive optical element 10. More preferably, the refractive indices satisfy the below-described condition (5).

An example of the manufacture procedure of the diffractive optical element 10 in the embodiment of the present invention is explained next with reference to FIG. 3. Firstly, there are prepared a mold 30 for forming a predetermined relief pattern 20, third and fourth optical element components 11, 12 (both resin-made) formed by mold injection, one surface of the component being curved, the other surface being flat and perpendicular to the optical axis, and materials 13', 14' (both UV-curable resins) for forming uncured first and second optical element components. The materials 13', 14 that constitute the first and second optical element components have relatively high refractive index and low dispersion, and low refractive index and high dispersion. The materials used in the first, second, third and fourth optical element components 13, 14, 11 and 12 are preferably the materials used in the optical element components illustrated in the below-described examples.

Firstly, a silane coupling treatment is carried out by providing beforehand a thin film of at least one among SiO2 or Al2O3 on the surface of the third optical element component 11 where the material 13' comprised by the first optical element component is dripped. Similarly, a silane coupling treatment is carried out by providing beforehand a thin film of at least one among SiO2 or Al2O3 on the surface of the fourth optical element component 12 in contact with the second optical element component 14. If needed, the same treatment can be carried out at the interface between the first and second optical element components 13, 14.

Figure 3A:
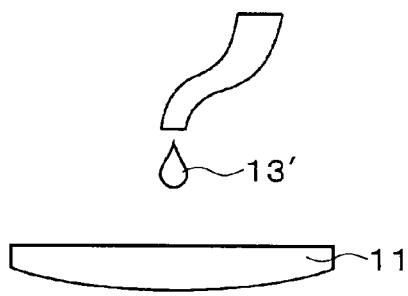
FIG. 3 is a diagram illustrating a manufacturing sequence (a) through (h) of the diffractive optical element according to the present invention.

Next, the material 13' comprised by the first optical element component is dripped on the flat surface of such a third optical element component 11 (FIG. 3(a)). A mold 30, on which the relief pattern 20 is formed, is then pressed against the dripped material 13' comprised by the first optical element component (FIG. 3(b)). Then, the material 13' comprised by the first optical element component is cured through irradiation of ultraviolet radiation UV from the side of the third optical element component 11 (FIG. 3(c)). The mold 30 is then removed from the cured material 13' comprised by the first optical element component (FIG. 3(d)). While the material 13' comprised by the first optical element component is curing, the shape of the relief pattern 20 formed on the mold 30 is transferred to form the first optical element component 13.

Figure 3E:
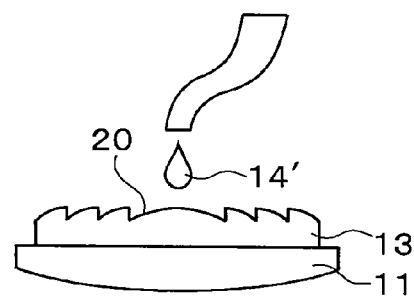
Figure 3B:
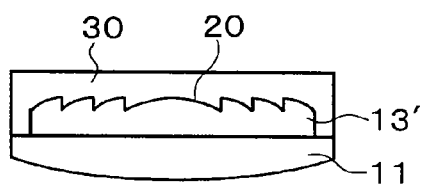
Figure 3F:
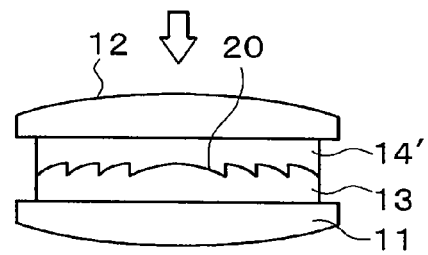
Figure 3C:
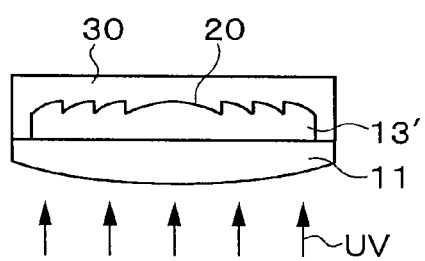
Figure 3G:
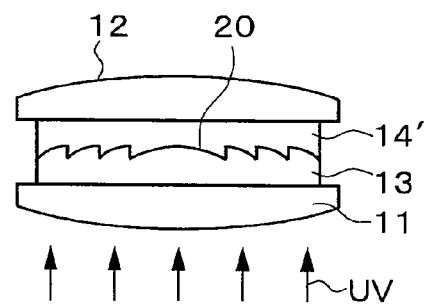
Figure 3D:
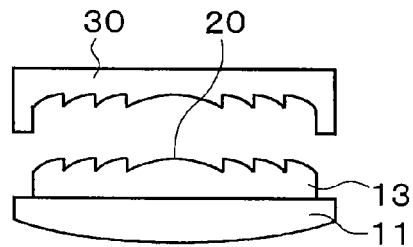
Figure 3H:
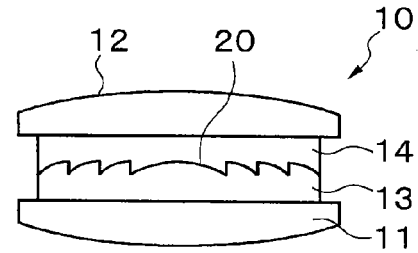

Next, a liquid material 14' comprised by the second optical element component is dripped onto the surface of the first optical element component 13, manufactured as described above, where the relief pattern 20 is formed (FIG. 3(e)). Then the flat surface of the fourth optical element component 12 is pressed against the dripped material 14' comprised by the second optical element component, on the opposite side to the relief pattern 20, in such a way so as to achieve a desired thickness and diameter of the material 14 comprised by the second optical element component (FIG. 3(f)). The material 14' comprised by the second optical element component is then cured through irradiation of ultraviolet radiation UV (FIG. 3(g)). This completes the diffractive optical element of the present invention, in which the first and second optical element components 13, 14, closely bonded via the relief pattern 20, are sandwiched and bonded between the third and fourth optical element components 11, 12 (FIG. 3(h)).

Although such a manufacturing method is a method for manufacturing a bonded-multilayer diffractive optical element, among all steps, only the formation of the relief pattern 20 on the third optical element component 13 is a step of forming a relief pattern, and only one mold 30 need be formed beforehand. The diffractive optical element 10 of the present invention can thus be manufactured at a low cost using simple manufacturing operations.

In the embodiment of the present invention, at least one optical material among the optical material comprised by the third or fourth optical element components 11, 12 has preferably a refractive index that is closer to that of the optical material of the optical element component formed last, than to that of the optical element component formed first, among the first and second optical element components 13, 14. Specifically, in the case of the diffractive optical element 10 of the present invention manufactured based on the above-described procedure, i.e. in the case where the material 13' comprised by the first optical element component is first dripped on the third optical element component 11 and is cured, after which the material 14' comprised by the second optical element component is dripped and cured, the refractive index of the second optical element component 14 is preferably closer to the refractive index of the fourth optical element component 12.

Such a constitution eliminates the optical influence exerted by small irregularities that occurred on the surfaces where no relief pattern was formed during manufacture of a conventional bonded-multilayer diffractive optical element comprising an UV-curable resin, so that a better optical performance can be ensured as a result.

Preferably, the optical material comprised by the third and fourth optical element components 11, 12 is a resin, while the optical materials comprised by the first and second optical element components 13, 14 are UV-curable resins having mutually different refractive indices. Using thus resins for all the optical element components allows realizing a smaller, lighter diffractive optical element 10. Also, using UV-curable resins in the first and second optical element components 13, 14 allows reducing the number of operations, thereby facilitating manufacture and increasing productivity, all of which contributes to cutting costs. Further increases in manufacturing efficiency can be achieved if the resin of the third and fourth optical element components 11, 12 is injection-moldable.

Preferably, the third or fourth optical element components 11, 12 comprise both the same resin material. This contributes to reducing material costs.

Preferred materials comprised by the third and fourth optical element components 11, 12 include, specifically, acrylic resins, polycarbonate, olefinic resins, acrylic-styrene copolymers, polyester and the like.

Figure 4:
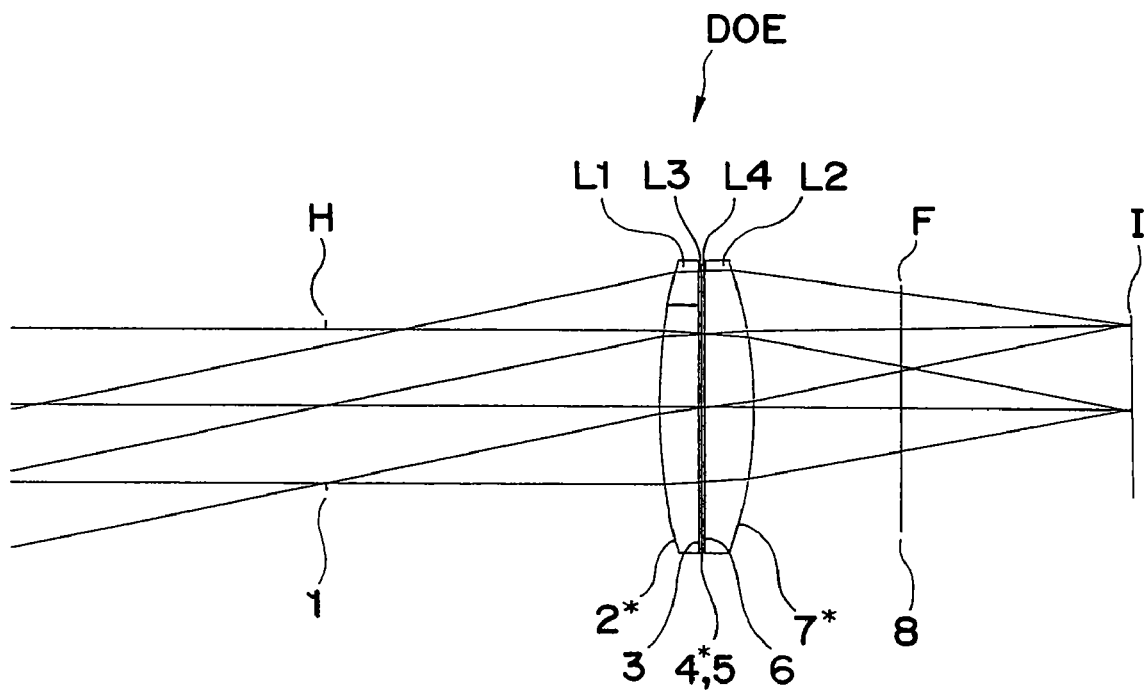
FIG. 4 is a cross-sectional diagram of an optical system of a first example using the diffractive optical element according to the present invention.

In the embodiment of the present invention, the diffractive optical element 10 is constituted as an eyepiece optical system as shown in FIG. 4. In this eyepiece optical system, light from an image positioned at I, in the figure, strikes the pupil H of a user, who perceives an enlarged image. Although this optical system is an optical system where a virtual image forms at infinity, the present invention is not limited thereto. Using this diffractive optical element 10 in an eyepiece optical system affords the following advantages. As a first advantage, the optical element count in the eyepiece optical system is reduced, thereby enabling size and weight reductions. In portable displays, which cannot have large display elements, the diffractive optical element 10 is also effective in allowing forming on the retina of the user a projected image of the display element, enlarged by the eyepiece optical system, and imparted with good chromatic aberration correction. The resulting realism for the user, combined with the lighter weight, have the effect of reducing user discomfort upon wearing of the eyepiece optical system. Such a weight reduction makes it less necessary to reinforce the support structure itself of the display element, thereby enabling weight reduction of the various components that constitute the wearable display device.

Color shift occurs conventionally when optical axis alignment between a refraction optical element and a diffraction optical element is not accurate. Color shift is particularly conspicuous when, as is usually the case, the dispersion of the diffractive optical element is larger than that of the refractive optical element. However, in the diffractive optical element 10, having diffractive optical element portions between refractive lenses, alignment of the optical axes of the refractive optical elements and the diffractive optical elements is carried out beforehand as a manufacturing step, and hence no rigorous alignment is required during assembly as the eyepiece optical system. This simplifies, as a result, the manufacture of the lens barrel that is part of the eyepiece optical system, and allows hence manufacturing inexpensively a lighter eyepiece optical system.

In the diffractive optical element of the invention, moreover, the diffractive optical element portions and the refractive lenses are integrated as a single unit, and hence the diffractive optical element has fewer air-interface surfaces compared to conventional optical systems, where the diffractive optical elements and the refractive lens are provided separately. Reflection losses and flare are reduced as a result, so that the user can enjoy a clear magnified image.

In the present eyepiece optical system, moreover, the relief pattern 20, which is apt to give rise to flare, is positioned substantially at the exit pupil position. This allows curbing impaired viewing of the projected image by the user, caused by flare.

Preferably, the surface 21 closest to the object and the surface 22 closest to the image have respective predetermined curvatures, the other surfaces have flat surfaces perpendicular to the optical axis, and the relief pattern 20 is planarly formed perpendicular to the optical axis. All these surfaces correspond to interface surfaces with the environment (air).

Preferably, the diffractive optical element 10 of the present invention having the above constitution satisfies condition (1)

$$L < dx \qquad (1)$$

wherein L is the optical length difference, along the optical axis direction, of the most phase-advanced and most phase-delayed portions of the wavefront after diffraction of a light beam passing through the relief pattern 20, and dx is the thickness of one of the first or second optical element components 13, 14 positioned at the exit of the relief pattern 20.

The conditional equation (1) stipulates the condition that, in the diffractive optical element 10 of the present invention, the exit-side medium has a constant refractive index until the light of the most phase-advanced portion and the light of the most phase-delayed portion in the wavefront after diffraction of a light beam passing through the relief pattern 20 exit from a same exit side. Satisfying equation (1) allows securing a predetermined diffracted light.

In the below-described examples, the relief pattern is rotationally symmetrical and thus the optical length difference L along the optical axis direction of the most phase-advanced and most phase-delayed portions of the wavefront after diffraction of a light beam passing through the relief pattern 20 is set in accordance with equation (1)':

$$L = \text{Pupil maximum value}/(\text{grating minimum pitch } P \times \text{exit refractive index}) \times 1/2 \times \text{design wavelength maximum value} \qquad (1)'$$

(wherein 7 (mm) is used as the as the pupil maximum value, and 656.27 (nm) is used as the design wavelength maximum value (the C-line wavelength in the present embodiment)).

The diffractive optical element 10 of the present invention preferably satisfies also condition (2)

$$(d3 + d4)/d < 0.5 \qquad (2)$$

wherein d3 is the thickness of the first optical element component 13 along the optical axis, d4 is the thickness of the second optical element component 14 along the optical axis, and d is the sum of the thicknesses along the optical axis of the third, fourth, first and second optical element components 11, 12, 13 and 14.

The conditional equation (2) prescribes an appropriate ratio for the overall thickness d of the lens group and the thicknesses along the optical axis d3, d4, of the first and second optical element components 13, 14. Exceeding the upper limit of the conditional equation (2) implies excessive thicknesses along the optical axis d3, d4 of the first and second optical element components 13, 14, which is likely to give rise to inconveniences such as difficulties in forming the relief pattern 20, being also undesirable on account of longer molding times. Equally undesirable is the associated increased absorption by the resin, and the loss of transmissivity in the optical system. An upper limit set to 0.2 is preferable with a view of bringing out the full effect of the present invention.

The diffractive optical element 10 of the present invention preferably satisfies also condition (3)

$$0.00001 < P/f < 0.03 \quad (3)$$

wherein P is the minimum pitch of the relief pattern 20 and f is the focal distance of the diffractive optical element 10.

The conditional equation (3) prescribes an appropriate ratio between the focal distance f of the entire lens group and the minimum pitch P. Exceeding the upper limit of the conditional equation (3) implies an excessively small minimum pitch P, a larger diffraction angle and greater chromatic dispersion on diffraction surfaces. Although effective as regards chromatic aberration correction, this may make processing more difficult and may reduce diffraction efficiency, giving rise to problems such as image quality loss on account of flare. Below the lower limit of the conditional equation (3), on the other hand, the minimum pitch P becomes excessive large, and sufficient achromatism cannot be obtained, which may give rise to problems such as image quality loss. An upper limit set to 0.01 is preferable with a view of bringing out the full effect of the present invention. Preferably, the lower limit is set to 0.002.

Preferably, the third and fourth optical element components 11, 12 of the diffractive optical element 10 of the present invention have a positive refractive power, and the diffractive optical element 10 satisfies also condition (4)

$$1.0 < fd/(f1 \cdot f2)1/2 < 20.0 \quad (4)$$

wherein f1 is the focal distance of the third optical element component 11, f2 is the focal distance of the fourth optical element component 12 and fd is the inverse of the refractive power (focal distance) of the relief pattern 20.

The conditional equation (4) prescribes an appropriate allotment of the refractive powers of the third and fourth optical element components 11, 12 and of the diffractive effect of the relief pattern 20. Exceeding the upper limit of the conditional equation (4) implies an excessively small diffractive effect by the relief pattern 20, which is problematic in that insufficient correction of chromatic aberration becomes likelier for short wavelengths. Below the lower limit of the conditional equation (4), conversely, the diffractive effect by the relief pattern 20 becomes excessively large, which is problematic in that insufficient correction of chromatic aberration becomes likelier for short wavelengths. An upper limit set to 15.0 is preferable with a view of bringing out the full effect of the present invention. Preferably, the lower limit is set to 2.0.

The diffractive optical element 10 of the present invention preferably satisfies also condition (5)

$$0.03 < |\{(nd3-1)/vd3-(nd4-1)/vd4\}/(nd3-nd4)| < 3.0 \quad (5)$$

wherein nd3 is the d-line refractive index of the first optical element component 13, nd4 is the d-line refractive index of the second optical element component 14, vd3 is the d-line Abbe number of the first optical element component 13 and vd4 is the d-line Abbe number of the second optical element component 14.

The reason for this is as follows. The diffractive optical element 10 in the embodiment of the present invention is assumed to satisfy equation (6)

$$(nd3-nd4) \cdot h = \lambda d \quad (6)$$

wherein the design wavelength corresponds to the d-line, nd3 and nd4 are the refractive powers of the first and second optical element components 13, 14 for the d-line, h is the grating height, and $\lambda d$ is the d-line wavelength.

Equation (6) above is an equation of the blaze condition of the d-line, when the diffraction efficiency for the d-line wavelength $\lambda d$ is greatest. If nd3, nd4 and $\lambda d$ are given, then the grating height h can be determined unambiguously as expressed by equation (7)

$$h = \lambda d/(nd3-nd4) \quad (7)$$

With a view of achieving good diffraction efficiency, in particular in wide wavelength regions (such as white light and the like), the diffractive optical element 10 of the present invention satisfies preferably the blaze condition for wavelengths other than the d-line. The C-line and the F-line are selected herein as wavelengths other than the d-line, and the diffractive optical element 10 is assumed to satisfy equations (8) and (9) that are the blaze conditions for the C-line and the F-line $$(nC3-nC4) \cdot h = \lambda C \quad (8)$$

$$(nF3-nF4) \cdot h = \lambda F \quad (9)$$

wherein nC3, nF3 are the refractive indices of the first optical element component 13 for the C-line and the F-line, and nC4, nF4 are the refractive indices of the second optical element component 14 for the C-line and the F-line, and $\lambda C$ and $\lambda F$ are the wavelengths for the C-line and the F-line.

Subtracting equation (8) from equation (9), we obtain the following equation (10)

$$(nF3-nF4) \cdot h - (nC3-nC4) \cdot h = \lambda F - \lambda C \quad (10)$$

Rearranging equation (10) yields equation (11)

$$(nF3-nF4) - (nC3-nC4) = (\lambda F - \lambda C)/h \quad (11)$$

In equation (11) h can be removed using equation (7), to yield equation (12)

$$(nF3-nF4) - (nC3-nC4) = (\lambda F - \lambda C) \cdot (nd3-nd4)/\lambda d \quad (12)$$

Rearranging equation (12) yields equation (13)

$$(nd3-nd4)/\{(nF3-nF4)-(nC3-nC4)\} = \lambda d/(\lambda F - \lambda C) \quad (13)$$

Substituting $\lambda d=0.5876$ μm, $\lambda F=0.4861$ μm and $\lambda C=0.6563$ μm in the right side of equation (13), we obtain equation (14)

$$(nd3-nd4)/\{(nF3-nF4)-(nC3-nC4)\} = -3.453 \quad (14)$$

Using the definition of the Abbe number vd, equation (14) can be transformed into equation (15)

$$(nd3-nd4)/\{(nd3-1)/vd3-(nd4-1)/vd4\} = -3.453 \quad (15)$$

wherein vd3 is the Abbe number for the first optical element component 13, and vd4 is the Abbe number for the second optical element 14.

The absolute value of the inverse of equation (15) is the above-described equation (5), which has an ideal value of about 0.3. The right side of equation (15) is a value (the Abbe number of the diffractive optical element) determined on the basis of selected wavelengths (herein, the d-line, C-line and F-line), and indicates herein that the first optical element component 13 and the second optical element component 14 that constitute the diffractive optical element 10 should be selected to come as close as possible to the relationship of equation (15). Our findings show that a range between 0.03 and 3.0 yields the diffractive optical element 10 of the present invention having a wide wavelength-region characteristic with sufficiently small flare.

Accordingly, the conditional equation (5) prescribes the condition for obtaining sufficiently high diffraction efficiency across a predetermined wavelength region in the diffractive optical element 10 having a bonded-multilayer constitution. Exceeding the upper limit of conditional equation (5) is undesirable, as this precludes obtaining good diffraction efficiency across the entire wavelength region. The same applies to falling below the lower limit. An upper limit set to 0.5 and a lower limit set to 0.1 are preferable with a view of bringing out the full effect of the present invention.

The below-described Examples 1 through 3 satisfy all the numerical values indicated in the conditional equation (5). In all three examples are obtained diffractive optical elements having sufficient diffraction efficiency in the visible region, so that a diffractive optical element 10 of the present invention, in which a design solution is obtained that allows increasing diffraction efficiency, can be realized by selecting materials that satisfy the conditional equation (5).

In order to achieve a diffractive optical element 10 having yet superior performance/specifications, equations (16) and (17) below are preferably satisfied as well.

When the diffractive optical element 10 according to the embodiment of the present invention is incorporated, for instance, into an observation optical system for enlarging and observing images formed on as small display, an objective lens or the like, equation (16) is preferably satisfied $$0.1 < \phi \cdot R/f^2 < 2.0 \quad (16)$$

wherein f is the focal distance of the overall optical system, ø is the pupil diameter, and R is the eye relief.

The conditional equation (16) denotes an appropriate relationship between pupil diameter, eye relief and focal distance when the diffractive optical element 10 according to the embodiment of the present invention is incorporated into an observation optical system. Designing a sufficient eye relief is important when constructing an observation optical system.

Exceeding the upper limit of the conditional equation (16) is problematic in that the resulting excessively long eye relief is likely to increase the size of the optical system. On the other hand, falling below the lower limit of the conditional equation (16) is problematic in that the eye relief becomes excessively short, the eyepiece may be difficult to handle for an observer wearing glasses, and the smaller pupil diameter may make contact likelier, all of which hinder observation during actual use of the system. The pupil need not be necessarily circular, and it may be rectangular or oval, depending on the application or the designed use. The shape of the pupil may be arbitrarily decided by devising accordingly the shapes of the lens and the diaphragm. For achieving a further effect, the upper limit is set preferably to 1.0. The lower limit is set preferably to 0.15.

Observation optical systems are typified by ocular optical systems. The spectral width used in these systems is limited to a width from about the F-line to about the C-line, although in the case, for instance, of solid imaging elements like CCDs having spectral sensitivity extending across a broad spectral width, good performance is required up to about the g-line. In order to achieve excellent performance across an even broader spectral width, the diffractive optical element 10 of the present invention satisfies preferably equation (17)

$$0.001 < |(nd4-nd3)/(vg4-vg3)| < 0.03 \quad (17)$$

wherein nd3 is the d-line refractive index of the first optical element component 13, nd4 is the d-line refractive index of the second optical element component 14, vg3 is the g-line Abbe number of the first optical element component 13 and vg4 is the g-line Abbe number of the second optical element component 14.

Exceeding the upper limit of the conditional equation (17) is problematic in that good diffraction efficiency cannot be obtained across the entire wavelength region, there occurs substantial flare, and good image quality cannot be obtained. The same applies to falling below the lower limit. An upper limit set to 0.01 and a lower limit set to 0.0015 are preferable with a view of bringing out the full effect of the present invention.

Preferably, the below-described conditions are also satisfied when the diffractive optical element 10 of the present invention is incorporated into an actual optical system.

In order to preserve good moldability and ensure superior productivity, the viscosity (uncured viscosity) of the material making up one of the first and second optical element components 13, 14 is preferably at least 40 or more. A viscosity of not more than 40 is problematic in that resin flow is exacerbated during molding, which hampers precision of the molded shape. On the other hand, the viscosity of the material constituting the other optical element component is, by contrast, preferably at least 2000 or more.

On the side of the eye of the observer, preferably, there is arranged the optical element component using the resin material having the better weatherability, among the third and fourth optical element components 11, 12, which sandwich from outside the first and second optical element components 13, 14 that are closely bonded with the relief pattern 20 at the interface therebetween.

When the third optical element component 11 and the first or second optical element components 13, 14 can be made of the same material, they are preferably molded integrally. The fourth optical element component 12 may comprise the same material as one among the first and second optical element components 13, 14. This is advantageous for facilitating manufacturing, in terms of reducing part numbers.

However, one of the materials making up the first or second optical element component 13, 14 must have a higher refractive index, and a lower dispersion, than the other material. It is often difficult to find materials that fulfill this condition and that satisfy also the requirements of a refractive lens. In cases involving such difficulties, the diffractive optical element 10 having the constitution illustrated in FIG. 2 is obviously preferable.

When, as described above, all the materials constituting the diffractive optical element 10 according to the embodiment of the present invention are resins, the specific gravities of the resins are all preferably not greater than 2.0. Resins have a smaller specific gravity than glass, and hence are extremely effective in reducing the weight of an optical system. For a further enhanced effect, the specific gravity of the resins is not greater than 1.6.

Preferably, the third and fourth optical element components 11, 12 have refractive surfaces of positive refractive power at the interface with air, the refractive surfaces being aspherical surfaces.

In the present invention, the incidence angle of the light beams passing through the surface where the relief pattern 20 is formed is preferably as small as possible. That is because when the above light ray incidence angle widens, the relief pattern 20 is likelier to give rise to flare, thereby impairing image quality. In the present invention, the incidence angles of all the light beams incident on the surface where the relief pattern 20 is formed are preferably not larger than 15 degrees.

Also, any of the first through fourth optical element components 11 through 14 may be imparted with a color filtering effect through the addition of a colorant to the resin. Such a procedure allows, for instance, constituting an infrared cut filter in a small imaging optical system.

Although the diaphragm may be arbitrarily arranged in the optical system, the diaphragm lets through preferably only light beams effective for image forming, by cutting unnecessary light beams. For instance, the lens frame itself may be made into an aperture diaphragm, the diaphragm may comprise a mechanical member at a position removed from the lens, or the diaphragm may be arranged in the space between the lens and the image surface. The diaphragm is not limited to a circular shape, and may be rectangular or oval, depending on the designed use.

When the diffractive optical element 10 of the present invention is used in a projection optical system, an optical low pass filter may also be built into the inside or the outside of the optical element 10.

When used in an observation optical system, the diffractive optical element 10 of the present invention has preferably a loop multiple ranging from 2-fold to 20-fold.

An optical system comprising plural constituent elements obtained by incorporating the diffractive optical element 10 of the present invention does not depart from the scope of the present invention. The same applies to an optical system obtained by incorporating a refractive index distribution-type lens, a crystalline material lens and the like.

Various examples of the present invention are explained below with reference to accompanying drawings. In these examples, the phase differences of the diffraction optical surfaces are calculated in accordance with an ultrahigh refractive index method using ordinary refractive indices and the below-described aspherical surface equations (18) and (19). The ultrahigh refractive index method uses a determined equivalence relationship between aspherical surface shape and the grating pitch of a diffractive optical surface. In the examples, the diffractive optical surfaces are represented by data obtained by the ultrahigh refractive index method, i.e., on the basis of the below-described aspherical equations (18) and (19), and coefficients thereof. The aberration characteristics selected for calculations in the examples correspond to the d-line (wavelength 587.6 nm, refractive index 10001), the C-line (wavelength 656.3 nm, refractive index 11170.4255), the F-line (wavelength 486.1 nm, refractive index 8274.7311), and the g-line (wavelength 435.8 nm, refractive index 7418.6853).

In the examples, the aspherical surface is given by the conditional equations (18) and (19)

$$S(y) = (y2/r)/\{1+(1-k \cdot y2/r2)1/2\} + C2y2 + C4y4 + C6y6 + C8y8 + C10y10 \quad (18)$$

$$R = 1/\{(1/r) + 2C2\} \quad (19)$$

wherein y is the height in the direction perpendicular to the optical axis, S(y) is the distance (sag) along the optical axis from a tangential plane at the apex of the aspherical surface to a position on the aspherical surface at the height y, r is the curvature radius of a reference spherical surface, R is the paraxial curvature radius, k is a conic coefficient, and Cn are n-th order aspherical surface coefficients.

In the examples, the lens surfaces formed as an aspherical surface are marked in the tables with an asterisk * to the right of the surface number. The phase differences of the diffraction optical surfaces are calculated in the examples in accordance with an ultrahigh refractive index method using ordinary refractive indices and the below-described aspherical surface equations (18) and (19). Thus, both the aspherical lens surfaces and the diffractive optical surfaces employ the aspherical equations (18) and (19), although the aspherical equations (18) and (19) used in the aspherical lens surfaces represent the aspherical surface shape itself on the lens surface, while the aspherical equations (18) and (19) used in the diffractive optical surfaces represent data on the performance of the diffractive optical surfaces.

In the examples, as described above, the optical length difference L along the optical axis direction of the most phase-advanced and most phase-delayed portions of the wavefront after diffraction of a light beam passing through the relief pattern 20 in equation (1) is set in accordance with equation (1)':

$$L = \text{Pupil maximum value}/(\text{grating minimum pitch } P \times \text{exit refractive index}) \times 1/2\% \times \text{design wavelength maximum value} \quad (1)'.$$

The relief pattern 20 is assumed to be rotationally symmetrical, 7 (mm) is used as the as the pupil maximum value, and 656.27 (mm) is used as the design wavelength maximum value (the C-line wavelength in the present embodiment).

First Example

A first example of the present invention is explained next with reference to FIGS. 4 through 6. In the first example, as illustrated in FIG. 4, a lens of an optical system using a diffractive optical element according to the present invention comprises, successively from the object, a pupil H, a diffractive optical element DOE, and a flare diaphragm F. In the figure, the image surface is denoted with the reference numeral I.

The diffractive optical element DOE of the present example thus arranged comprises, successively from the object, a third optical element component L1, a first optical element component L3, a second optical element component L4 and a fourth optical element component L2, such that the minimum pitch P is 0.0171 mm and the height h of the relief pattern is 20.05 µm.

In the present example, a ZEONEX 480R lens by Zeon Corp. was used as the third and fourth optical element components L1, L2, a below-described UV-curable resin having relatively low refractive index and high dispersion was used as the first optical element component L3, and a below-described UV-curable resin having relatively high refractive index and low dispersion was used as the second optical element component L4.

The relatively low refractive index, high dispersion UV-curable resin was herein an UV-curable composition obtained by mixing 2,2,3,3,4,4,5,5-octafluorohexane-1,6-diacrylate, 9,9-bis[4-(2-acryloyloxyethoxy)phenyl]fluorene and Irgacure 184, and by and performing thereon predetermined operations. This resin is manufactured with such a mol ratio of 2,2,3,3,4,4,5,5-octafluorohexane-1,6-diacrylate and 9,9-bis[4-(2-acryloyloxyethoxy)phenyl]fluorene so as to yield a d-line refractive index of 1.528. The viscosity and specific gravity are, respectively, 100 and 1.4. For convenience, this resin is referred to hereafter as low-refractive index resin No. 1.

Next, the relatively high refractive index, low dispersion UV-curable resin was herein an UV-curable composition obtained through addition reaction of tricyclodecane dimethanol diacrylate and di(2-mercaptodiethyl)sulfide, followed by addition of Irgacure 184. This resin is manufactured with such a mol ratio of tricyclodecane dimethanol diacrylate and di(2-mercaptodiethyl)sulfide so as to yield a d-line refractive index of 1.557. The viscosity and specific gravity are, respectively, 4800 and 1.2. For convenience, this resin will be referred to hereafter as high-refractive index resin No. 1.

Table 1 below illustrates data on various lenses in the first example. The surface numbers 1 through 8 in Table 1 correspond to the reference numerals 1 through 8 in FIG. 4. The first surface is the pupil surface. In Table 1, r denotes the radius of curvature of the lens surface (the radius of curvature of a reference spherical surface, in the case of an aspherical surface), d denotes the gap between lens surfaces, nd denotes the d-line refractive index, nc denotes the C-line refractive index, nf denotes the F-line refractive index, and ng denotes the g-line refractive index. The values corresponding to the above-described conditional equations (1) through (7), i.e. the condition-corresponding values are also indicated below. Unless otherwise specified, the units used for the radius of curvature r, the surface gap d and other lengths are "mm" for all the values below. The units, however, are not limited to "mm", and other suitable units may be used, since the same optical performance is obtained when proportionally expanding or contracting the optical radius. The above explanation applies also for the tables in the other examples.

The lens surfaces formed as an aspherical surface are marked in Table 1 with an asterisk * to the right of the surface number. In the present example, the surfaces corresponding to the surface Nos. 2 and 7 are aspherical surfaces, while the surface corresponding to the surface No. 4 is a diffractive optical surface. The diffractive optical surface is represented using the ultrahigh refractive index method. The diffractive optical surface is represented as a combination of extremely high refractive index values such as nd=10001 and aspherical surface coefficients.

TABLE 1

| m | r | d | nd | nc | nf | ng |
|---|---|---|---|---|---|---|
| 1 | 0.00000 | 21.00000 | 1.000000 | | | |
| 2 | 28.79601 | 2.81000 | 1.524700 | 1.521960 | 1.531290 | 1.536490 |
| 3 | 0.0000 | 0.2000 | 1.527600 | 1.523300 | 1.538500 | 1.547700 |
| 4* | 0.00000 | 0.00000 | 10001 | 11170.4255 | 8274.7311 | 7418.6853 |
| 5 | 0.00000 | 0.20000 | 1.556900 | 1.553700 | 1.564800 | 1.571100 |
| 6 | 0.00000 | 3.13000 | 1.524700 | 1.521960 | 1.531290 | 1.536490 |
| 7* | −28.78899 | 9.40000 | 1.000000 | | | |
| 8 | 0.00000 | 14.86207 | 1.000000 | | | |

(Aspherical surface data)

| m | k | C4 | C6 | C8 | C10 |
|---|---|---|---|---|---|
| 2 | −1.244 | $4.750 \times 10^{-5}$ | $-1.2469 \times 10^{-6}$ | $1.365 \times 10^{-8}$ | $-6.2316 \times 10^{-11}$ |

| m | k | C2 | C4 | C6 | C8 | C10 |
|---|---|---|---|---|---|---|
| 4 | 1.0000 | $1.496 \times 10^{-7}$ | $-1.4772 \times 10^{-9}$ | $4.3706 \times 10^{-11}$ | $-5.3385 \times 10^{-13}$ | $2.28480 \times 10^{-15}$ |

| m | k | C4 | C6 | C8 | C10 |
|---|---|---|---|---|---|
| 7 | −9.3788 | $-7.7448 \times 10^{-6}$ | $-5.1606 \times 10^{-7}$ | $5.5107 \times 10^{-9}$ | $-2.6239 \times 10^{-11}$ |

(Condition-fulfilling values)

L = 0.086
dx = 0.20000
d3 = 0.2
d4 = 0.2
d = 6.34
P = 0.0171
f = 26.430
fd = 334.242
f1 = 54.881
f2 = 54.868
nd3 = 1.5276
nd4 = 1.5569
vd3 = 34.71
vd4 = 50.17
ø = 10.0
R = 21.0
vg3 = 21.62
vg4 = 32.19
(1) L = 0.086 < dx = 0.2000
(2) (d3 + d4)/d = 0.06309 < 0.5

TABLE 1-continued (3) $0.00001 < P/f = 0.000647 < 0.03$
(4) $1.0 < fd/(f1 \cdot f2)^{1/2} = 6.091 < 20.0$
(5) $0.03 < |\{(nd3 - 1)/vd3 - (nd4 - 1)/vd4\}/(nd3 - nd4)| = 0.1399 < 3.0$
(6) $0.1 < \phi \cdot R/f2 = 0.301 < 2.0$
(7) $0.001 < |(Nd4 - Nd3)/(vg4 - vg3)| = 0.002772 < 0.03$ In the present example, therefore, all the above conditional equations (1) through (7) are satisfied.

Figure 5:
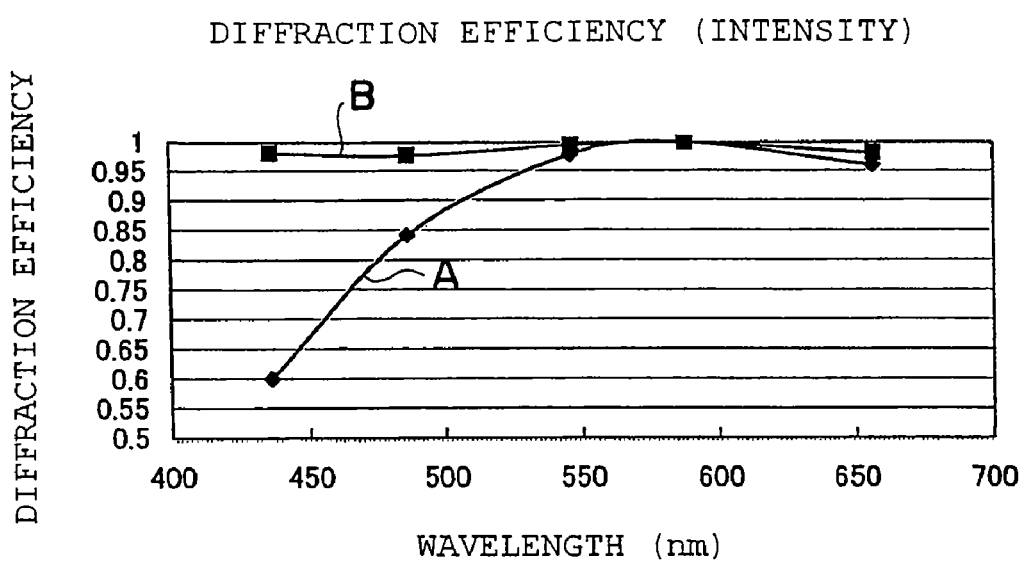
FIG. 5 is a diagram illustrating diffraction efficiency relative to various wavelengths in the diffractive optical element of the first example.

In the curves A and B in FIG. 5, the curve A represents the diffraction efficiency of a single-layer diffractive optical element in which the relief pattern is formed on the surface of the low-refractive index resin No. 1, and the curve B represents the diffraction efficiency of a multilayer diffractive optical element comprising the low-refractive index resin No. 1 and the high-refractive index resin No. 1, wherein the height of the respective relief patterns is set so as to yield a diffraction efficiency of 100% for the d-line. The diffractive optical element of the present example having the above constitution affords high diffraction efficiency (optical intensity) of at least 0.98 across a wavelength region extending from the g-line to the C-line.

Figure 6:
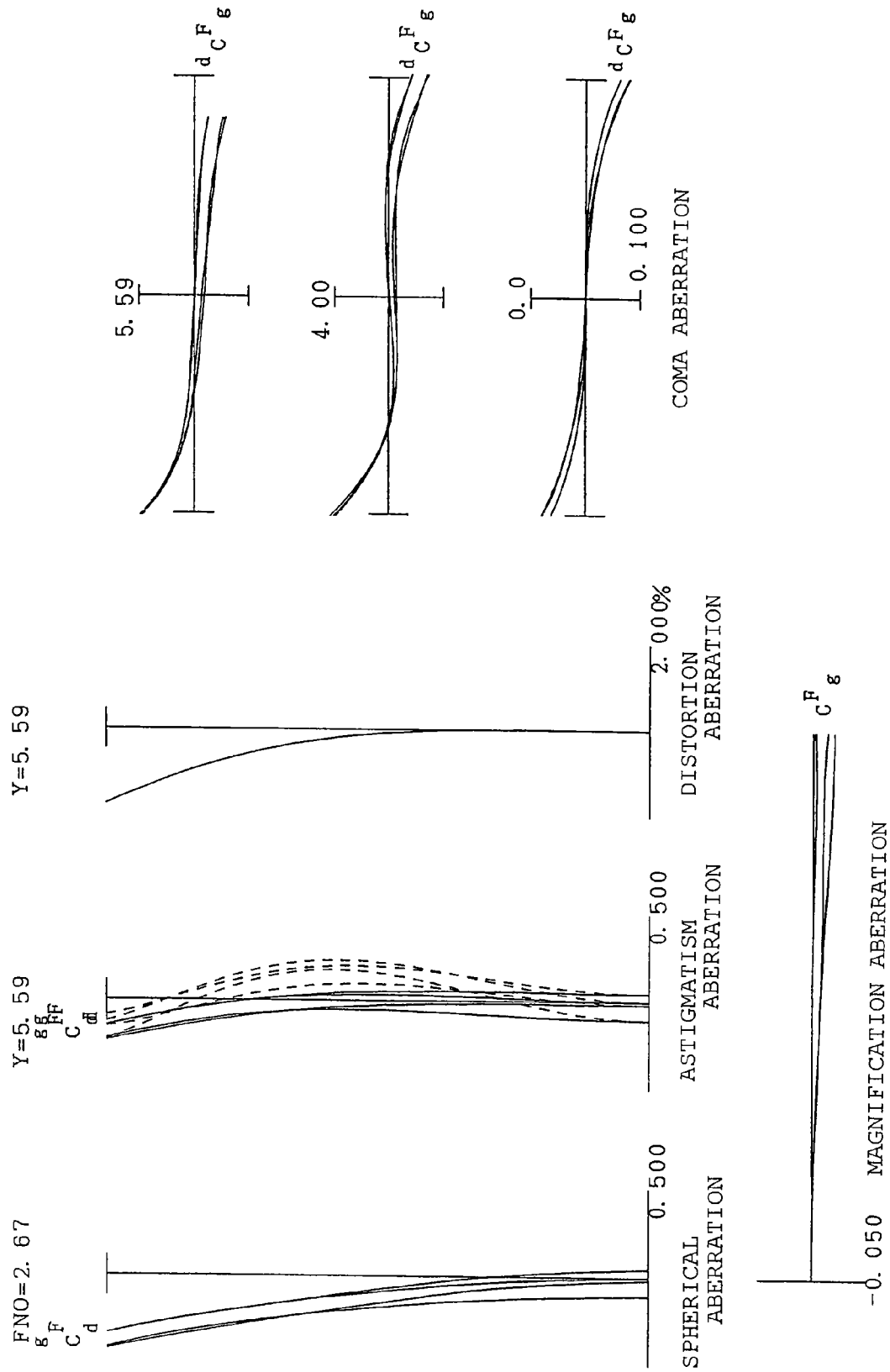
FIG. 6 is a set of aberration graphs of the optical system in the first example.

FIG. 6 illustrates various aberration graphs in the first example. The aberration graphs illustrate results for the d-line (the spherical aberration graph and the magnification aberration graph illustrate also the results for the g-line, the C-line and the F-line). FNO denotes the F-number and Y denotes the image height. In the spherical aberration graph is represented the value of the F-number corresponding to maximum aperture. In the astigmatism graph and the distortion graph are illustrated the largest values of image height, while in the coma aberration graph are illustrated various image heights. In the astigmatism graph, the solid line denotes the sagittal image surface, while the broken line denotes the meridional image surface. The above explanation of the aberration graphs applies equally to the other examples. As the various aberration graphs clearly indicate, the present example affords good aberration correction, thereby ensuring excellent image forming performance.

Second Example

Figure 7:
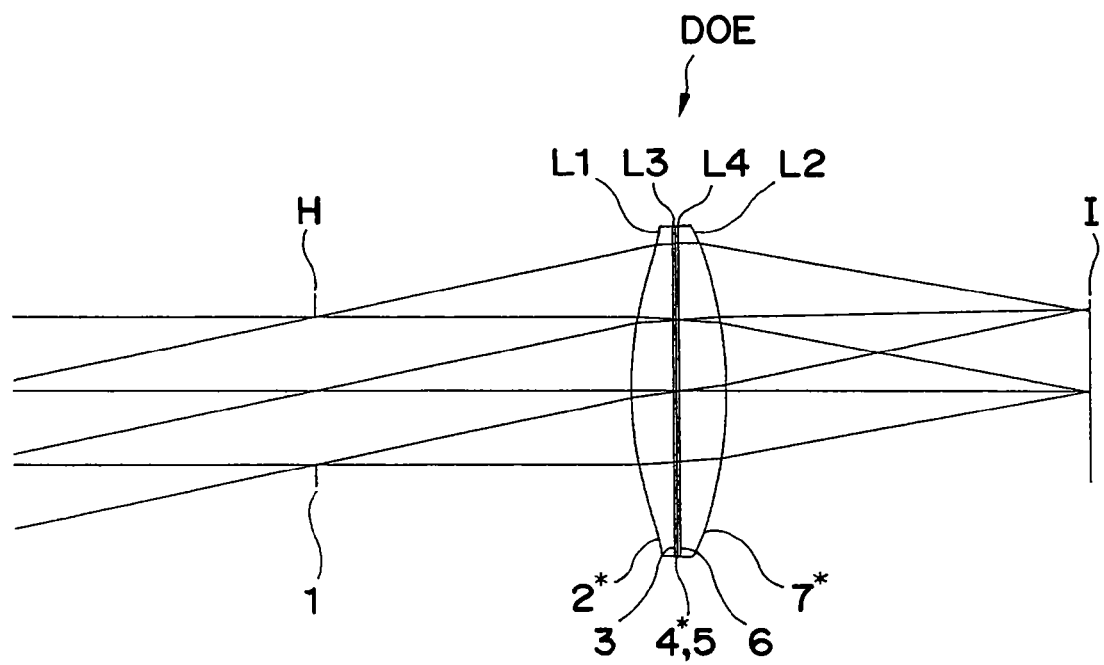
FIG. 7 is a cross-sectional diagram of an optical system of a second example using the diffractive optical element according to the present invention.

A second example of the present invention is explained next with reference to FIGS. 7 through 9. In the second example, as illustrated in FIG. 7, a lens of an optical system using a diffractive optical element according to the present invention comprises, successively from the object, a pupil H, and a diffractive optical element DOE. In the figure, the image surface is denoted with the reference numeral I.

The diffractive optical element DOE of the present example thus arranged comprises, successively from the object, a third optical element component L1, a first optical element component L3, a second optical element component L4 and a fourth optical element component L2, such that the minimum pitch P is 0.0171 mm and the height of the relief pattern is 22.69 μm.

In the present example, an acrylic resin was used as the third optical element component L1, a ZEONEX 480R lens by Zeon Corp. was used as the fourth optical element component L2, a high-refractive index resin No. 2 (having a composition ratio different from that of the above high-refractive index resin No. 1) was used as the first optical element component L3, and the above low-refractive index resin No. 1 was used as the second optical element component L4.

The high-refractive index resin No. 2 is a resin manufactured with such a mol ratio of tricyclodecane dimethanol diacrylate and di(2-mercaptodiethyl)sulfide so as to yield a d-line refractive index of 1.554 (lower refractive index than that of the second optical element component L4). The viscosity and specific gravity are, respectively, 2500 and 1.2.

Table 2 below illustrates data on various lenses in the second example. The surface numbers 1 through 7 in Table 2 correspond to the reference numerals 1 through 7 in FIG. 7. The lens surfaces formed as an aspherical surface are marked in Table 2 with an asterisk * to the right of the surface number. In the present example, the surfaces corresponding to the surface Nos. 2 and 7 are aspherical surfaces, while the surface corresponding to the surface No. 5 is a diffractive optical surface. As in the first example, the diffractive optical surface is represented based on the ultrahigh refractive index method.

TABLE 2

| m | r | d | nd | nc | nf | ng |
|---|---|---|---|---|---|---|
| 1 | 0.00000 | 21.00000 | 1.000000 | | | |
| 2* | 26.91000 | 2.81000 | 1.490800 | 1.488300 | 1.496900 | 1.501600 |
| 3 | 0.00000 | 0.20000 | 1.553490 | 1.550150 | 1.561130 | 1.567210 |
| 4 | 0.00000 | 0.00000 | 10001 | 11170.4255 | 8274.7311 | 7418.6853 |
| 5* | 0.00000 | 0.20000 | 1.527600 | 1.523300 | 1.538500 | 1.547700 |
| 6 | 0.00000 | 3.13000 | 1.524700 | 1.521960 | 1.531290 | 1.536490 |
| 7* | −28.78899 | 24.24000 | 1.000000 | | | |

| (Aspherical surface data) | | | | | | |
|---|---|---|---|---|---|---|
| m | | k | C4 | C6 | C8 | C10 |
| 2 | | −1.2440 | $4.7500 \times 10^{-5}$ | $-1.2469 \times 10^{-6}$ | $1.3650 \times 10^{-8}$ | $-6.23160 \times 10^{-11}$ |
| m | k | C2 | C4 | C6 | C8 | C10 |
| 5 | 1.0000 | $-1.4960 \times 10^{-7}$ | $1.4772 \times 10^{-9}$ | $-4.3706 \times 10^{-11}$ | $5.3385 \times 10^{-13}$ | $-2.28480 \times 10^{-15}$ |

TABLE 2-continued

| m | k | C4 | C6 | C8 | C10 |
|---|---|---|---|---|---|
| 7 | −9.3788 | −7.7448 × 10$^{-6}$ | −5.1606 × 10$^{-7}$ | 5.5107 × 10$^{-9}$ | −2.6239 × 10$^{-11}$ |

(Condition-fulfilling values)

L = 0.088
dx = 0.2000
d3 = 0.2
d4 = 0.2
d = 6.34
P = 0.0171
f = 26.430
fd = 334.243
f1 = 54.829
f2 = 54.868
nd3 = 1.5535
nd4 = 1.5276
vd3 = 50.41
vd4 = 34.71
ø = 10.0
R = 21.0
vg3 = 32.44
vg4 = 21.62
(1) L = 0.088 < dx = 0.2000
(2) (d3 + d4)/d = 0.06309 < 0.5
(3) 0.00001 < P/f = 0.000647 < 0.03
(4) 1.0 < fd/(f1 · f2)$^{1/2}$ = 6.094 < 20.0
(5) 0.03 < |{(nd3 − 1)/vd3 − (nd4 − 1)/vd4}/(nd3 − nd4)| = 0.5782 < 3.0
(6) 0.1 < ø · R/f2 = 0.301 < 2.0
(7) 0.001 < |(Nd4 − Nd3)/(vg4 − vg3)| = 0.002393 < 0.03

In the present example, therefore, all the above conditional equations (1) through (7) are satisfied.

Figure 8:
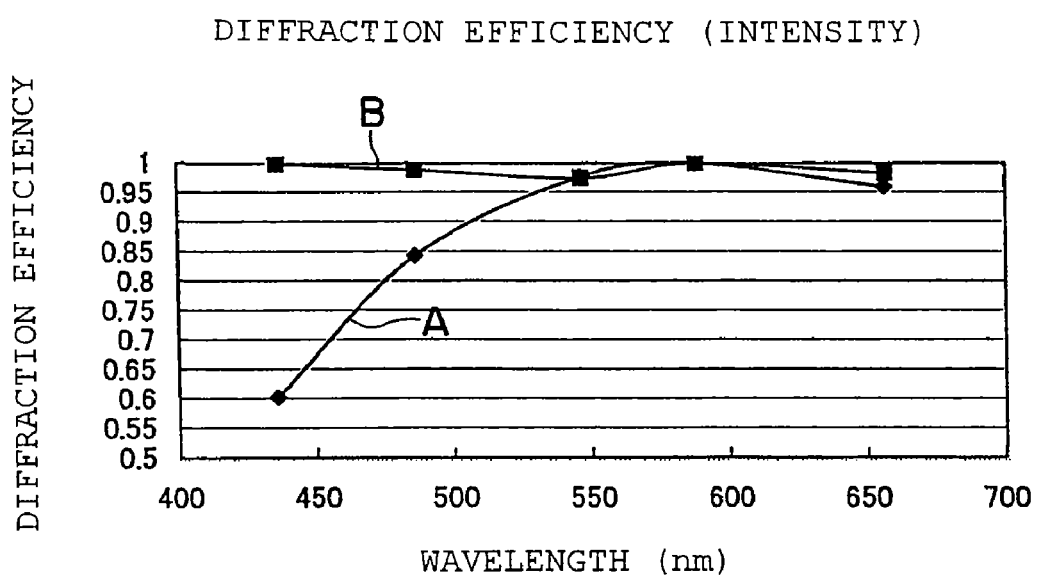
FIG. 8 is a diagram illustrating diffraction efficiency relative to various wavelengths in the diffractive optical element of the second example.

In the curves A and B in FIG. 8, the curve A represents the diffraction efficiency of a single-layer diffractive optical element in which the relief pattern is formed on the surface of the high-refractive index resin No. 2, and the curve B represents the diffraction efficiency of a multilayer diffractive optical element comprising the high-refractive index resin No. 2 and the low-refractive index resin No. 1, wherein the height of the respective relief patterns is set so as to yield a diffraction efficiency of 100% for the d-line. The diffractive optical element of the present example having the above constitution affords high diffraction efficiency (optical intensity) of at least 0.97 across a wavelength region extending from the g-line to the C-line.

Figure 9:
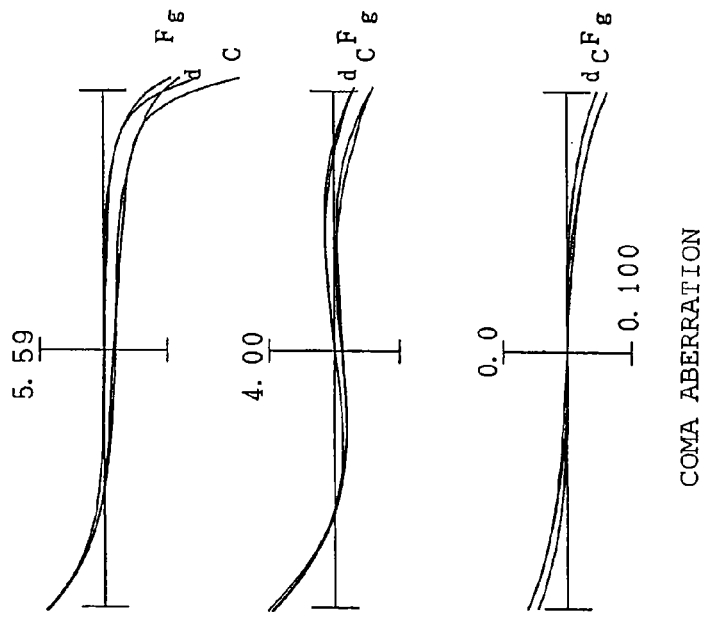
FIG. 9 is a set of aberration graphs of the optical system in the second example.
Figure 9:
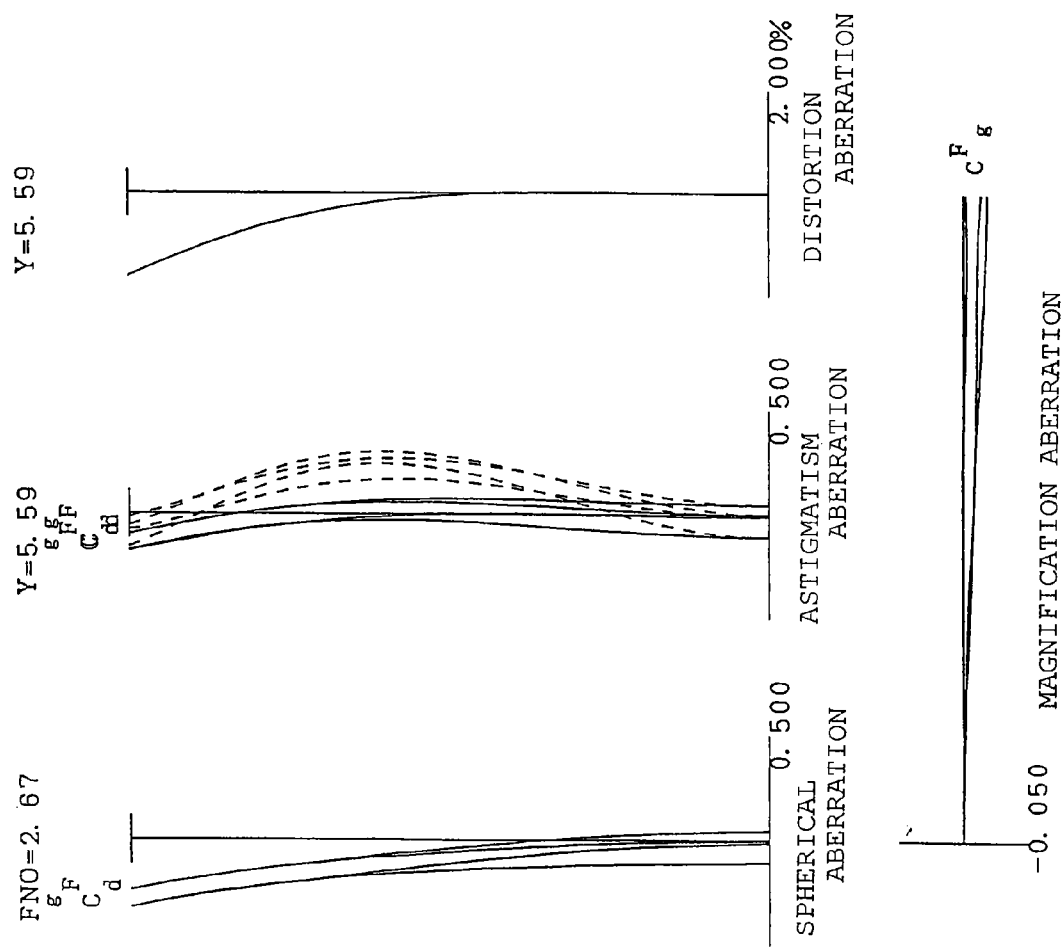

FIG. 9 illustrates various aberration graphs in the second example. As the various aberration graphs clearly indicate, the present example affords good aberration correction, thereby ensuring excellent image forming performance.

Third Example

Figure 10:
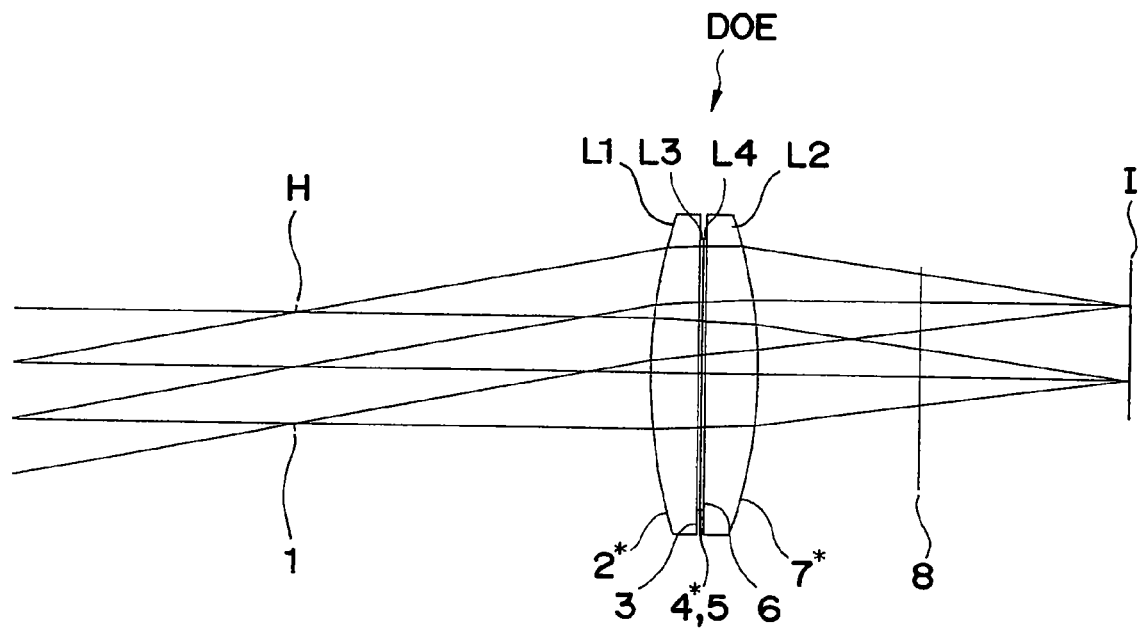
FIG. 10 is a cross-sectional diagram of an optical system of a third example using the diffractive optical element according to the present invention.

A third example of the present invention is explained next with reference to FIGS. 10 through 12. In the third example, as illustrated in FIG. 10, a lens of an optical system using a diffractive optical element according to the present invention comprises, successively from the object, a pupil H, a diffractive optical element DOE, and a flare diaphragm F. In the figure, the image surface is denoted with the reference numeral I.

The diffractive optical element DOE of the present example thus arranged comprises, successively from the object, a third optical element component L1, a first optical element component L3, a second optical element component L4 and a fourth optical element component L2, such that the minimum pitch P is 0.0170 mm and the height h of the relief pattern is 20.05 μm.

In the present example, a ZEONEX 480R lens by Zeon Corp. was used as the third optical element component L1, a polycarbonate material was used as the fourth optical element component L2, the low-refractive index resin No. 1 was used as the first optical element component L3, and the high-refractive index resin No. 1 was used as the second optical element component L4.

Table 3 below illustrates data on various lenses in the third example. The surface numbers 1 through 8 in Table 3 correspond to the reference numerals 1 through 8 in FIG. 10. The lens surfaces formed as an aspherical surface are marked in Table 3 with an asterisk * to the right of the surface number. In the present example, the surfaces corresponding to the surface Nos. 2 and 7 are aspherical surfaces, while the surface corresponding to the surface No. 4 is a diffractive optical surface. As in the first example, the diffractive optical surface is represented based on the ultrahigh refractive index method.

TABLE 3

| m | r | d | nd | nc | nf | ng |
|---|---|---|---|---|---|---|
| 1 | 0.00000 | 25.07322 | 1.000000 | | | |
| 2* | 34.38137 | 3.60000 | 1.524700 | 1.521960 | 1.531290 | 1.536490 |
| 3 | 0.00000 | 0.25000 | 1.527600 | 1.523300 | 1.538500 | 1.547700 |
| 4* | 0.00000 | 0.00000 | 10001 | 11170.4255 | 8274.7311 | 7418.6853 |

TABLE 3-continued

| | | | | | |
|---|---|---|---|---|---|
| 5 | 0.00000 | 0.25000 | 1.556900 | 1.553700 | 1.564800 | 1.571100 |
| 6 | 0.00000 | 3.70000 | 1.585180 | 1.579580 | 1.598930 | 1.610540 |
| 7* | −34.37299 | 11.50000 | 1.000000 | | | |
| 8 | 0.00000 | 14.99636 | 1.000000 | | | |

(Aspherical surface data)

| m | k | C4 | C6 | C8 | C10 |
|---|---|---|---|---|---|
| 2 | −1.230 | $2.79080 \times 10^{-5}$ | $-5.1390 \times 10^{-7}$ | $3.9464 \times 10^{-9}$ | $-1.2630 \times 10^{-11}$ |

| m | k | C2 | C4 | C6 | C8 | C10 |
|---|---|---|---|---|---|---|
| 4 | 1.0000 | $1.9130 \times 10^{-7}$ | $-8.6789 \times 10^{-10}$ | $1.8013 \times 10^{-11}$ | $-1.5434 \times 10^{-13}$ | $4.63370 \times 10^{-16}$ |

| m | k | C4 | C6 | C8 | C10 |
|---|---|---|---|---|---|
| 7 | −9.3788 | $-4.5503 \times 10^{-6}$ | $-2.1269 \times 10^{-7}$ | $1.5932 \times 10^{-9}$ | $-5.3214 \times 10^{-12}$ |

(Condition-fulfilling values)

L = 0.087
dx = 0.2500
d3 = 0.25
d4 = 0.25
d = 7.8
P = 0.0170
f = 28.982
fd = 261.383
f1 = 65.526
f2 = 58.739
nd3 = 1.5276
nd4 = 1.5569
vd3 = 34.71
vd4 = 50.17
ø = 8.0
R = 25.1
vg3 = 21.62
vg4 = 32.19
(1) L = 0.087 < dx = 0.2500
(2) (d3 + d4)/d = 0.06410 < 0.5
(3) 0.00001 < P/f = 0.000587 < 0.03
(4) 1.0 < fd/(f1 · f2)$^{1/2}$ = 4.213 < 20.0
(5) 0.03 < |{(nd3 − 1)/vd3 − (nd4 − 1)/vd4}/(nd3 − nd4)| = 0.1399 < 3.0
(6) 0.1 < ø · R/f2 = 0.2388 < 2.0
(7) 0.001 < |(Nd4 − Nd3)/(vg4 − vg3)| = 0.002772 < 0.03

In the present example, therefore, all the above conditional equations (1) through (7) are satisfied.

Figure 11:
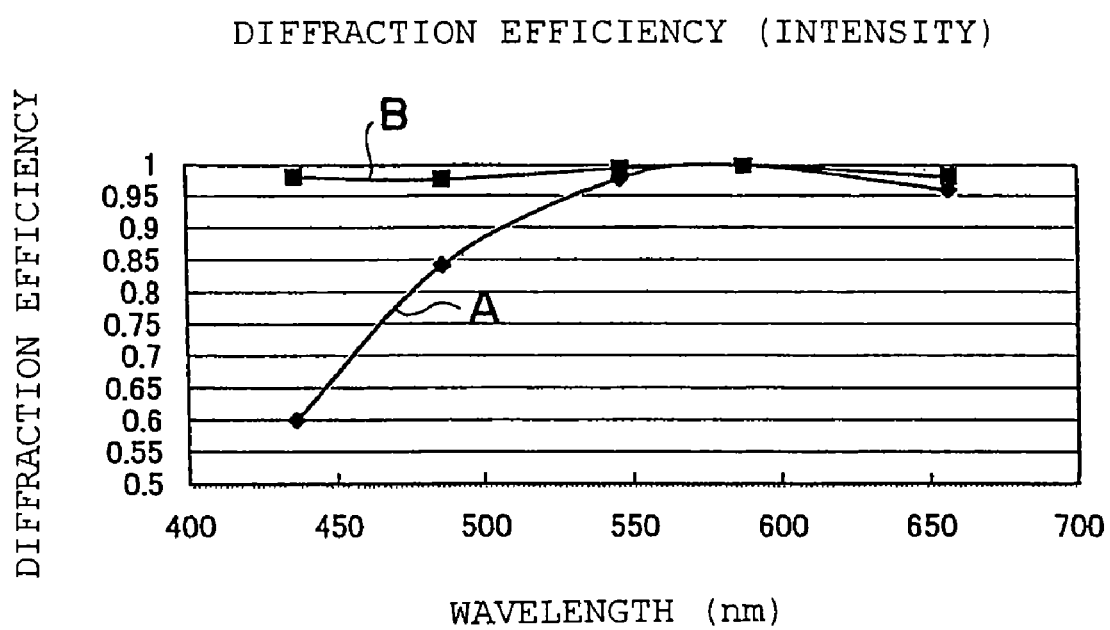
FIG. 11 is a diagram illustrating diffraction efficiency relative to various wavelengths in the diffractive optical element of the third example.

In the curves A and B in FIG. 11, the curve A represents the diffraction efficiency of a single-layer diffractive optical element in which the relief pattern is formed on the surface of the low-refractive index resin No. 1, and the curve B represents the diffraction efficiency of a multilayer diffractive optical element comprising the low-refractive index resin No. 1 and the high-refractive index resin No. 1, wherein the height of the respective relief patterns is set so as to yield a diffraction efficiency of 100% for the d-line. The diffractive optical element of the present example having the above constitution affords high diffraction efficiency (optical intensity) of at least 0.98 across a wavelength region extending from the g-line to the C-line.

Figure 12:
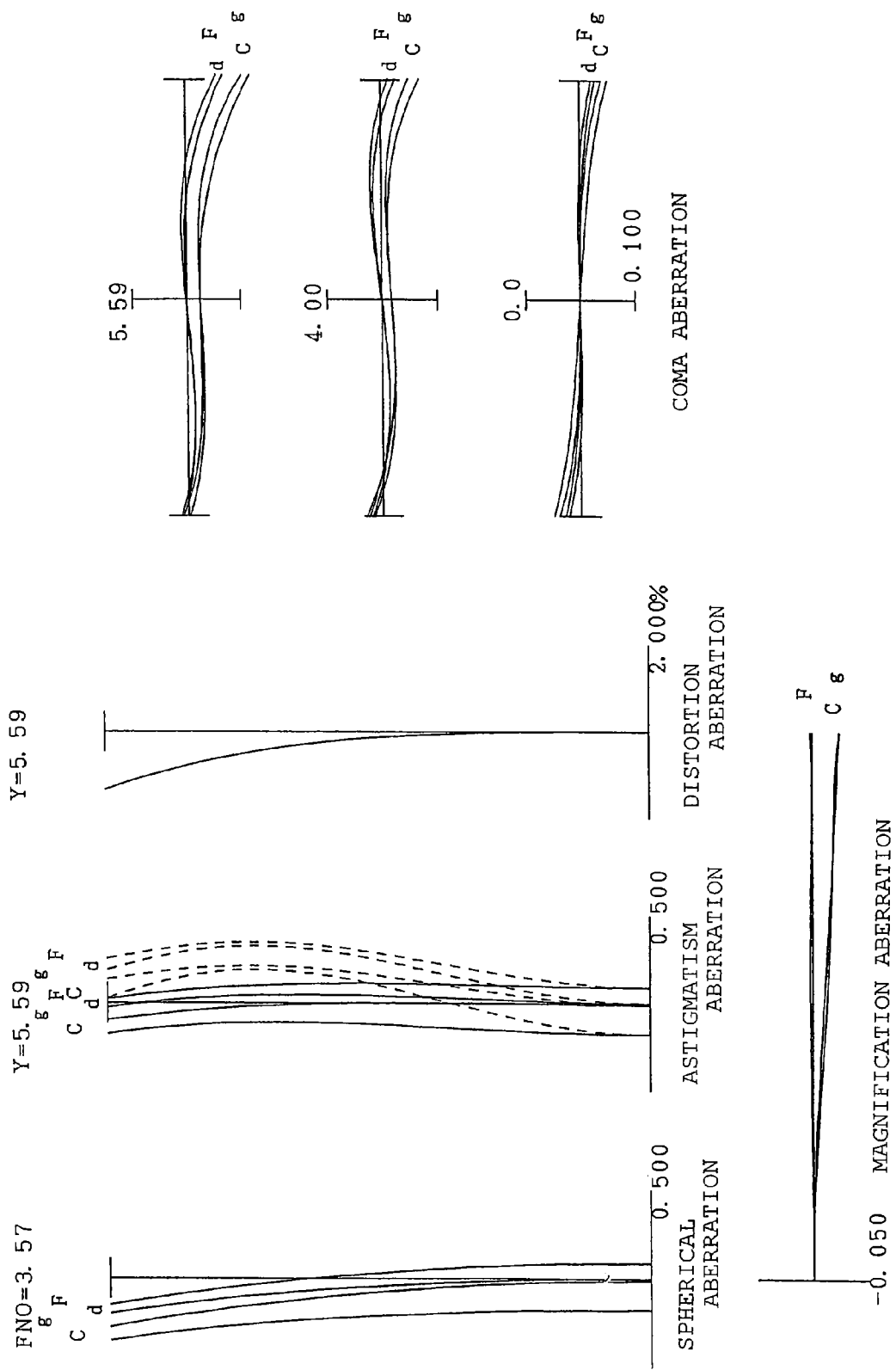
FIG. 12 is a set of aberration graphs of the optical system in the third example.

FIG. 12 illustrates various aberration graphs in the third example. As the various aberration graphs clearly indicate, the present example affords good aberration correction, thereby ensuring excellent image forming performance.

As illustrated in the first through the third examples, the diffractive optical element of the present invention is small and lightweight, and has excellent image-forming performance in the visible region from the g-line to the C-line. These characteristics enable the diffractive optical element to be used in an eyepiece of a head-mounted display, for instance the one illustrated in FIG. 13.

A head-mounted display, which is a system worn on the head of a user, for supplying projected images and sound to the latter, comprises a headphone-type head fitting member 40, a display unit 50 that can be mounted on the head fitting member 40, and a reproduction device 60 for supplying sound signals and video signals to the display unit 50, and for supplying power to the various members.

The head fitting member 40 comprises a pair of speakers 41 positioned in the vicinity of the left and right ears of the user when the latter wears the head-mounted display, an arm 42 for exerting an urging force, via the speakers 41, against both flanks of the head of the user, and ear hooks 43 extending arch-like from the speakers 41, for gripping the ears of the user. The speakers 41, which are shaped to be fittable on a coupling member 51 of the display unit 50, are provided on the outside with electric contacts 44 to the display unit 50. When the display unit 50 is not mounted on the speakers 41, dummy caps 55 are mounted on the speakers 41 with a view of improving external appearance.

The display unit 50 comprises the coupling member 51, fittable on the outside of the speakers 41; a housing member 52 mounted on the coupling member 51 and provided with a space for housing a below-described display arm 53; and a display arm 53 that can be housed in, and pulled out from, the housing member 52 and having mounted on the tip a display 54 that incorporates, for instance, a liquid crystal display element or the above diffractive optical element 10. The display unit 50 has wiring for connection with the reproduction device 60, such that power and video signals supplied from the reproduction device 60 are fed to the display 54, while sound signals are fed to the coupling member 51.

The coupling member 51 has an electric contact (not shown in the figure) that can connect with the electric contacts 44 of the speakers 41. The sound signals are supplied to the speakers 41 via that electric contact (not shown).

As described above, the display arm 53 can be housed in the housing member 52. When the head-mounted display is worn, the display arm 53 is pulled out of the housing member 52 in such a way that the display 54 becomes positioned in front of one eye of the user. When the head-mounted display is not used, the display arm 53 can be housed in the housing member 52.

Figure 13:
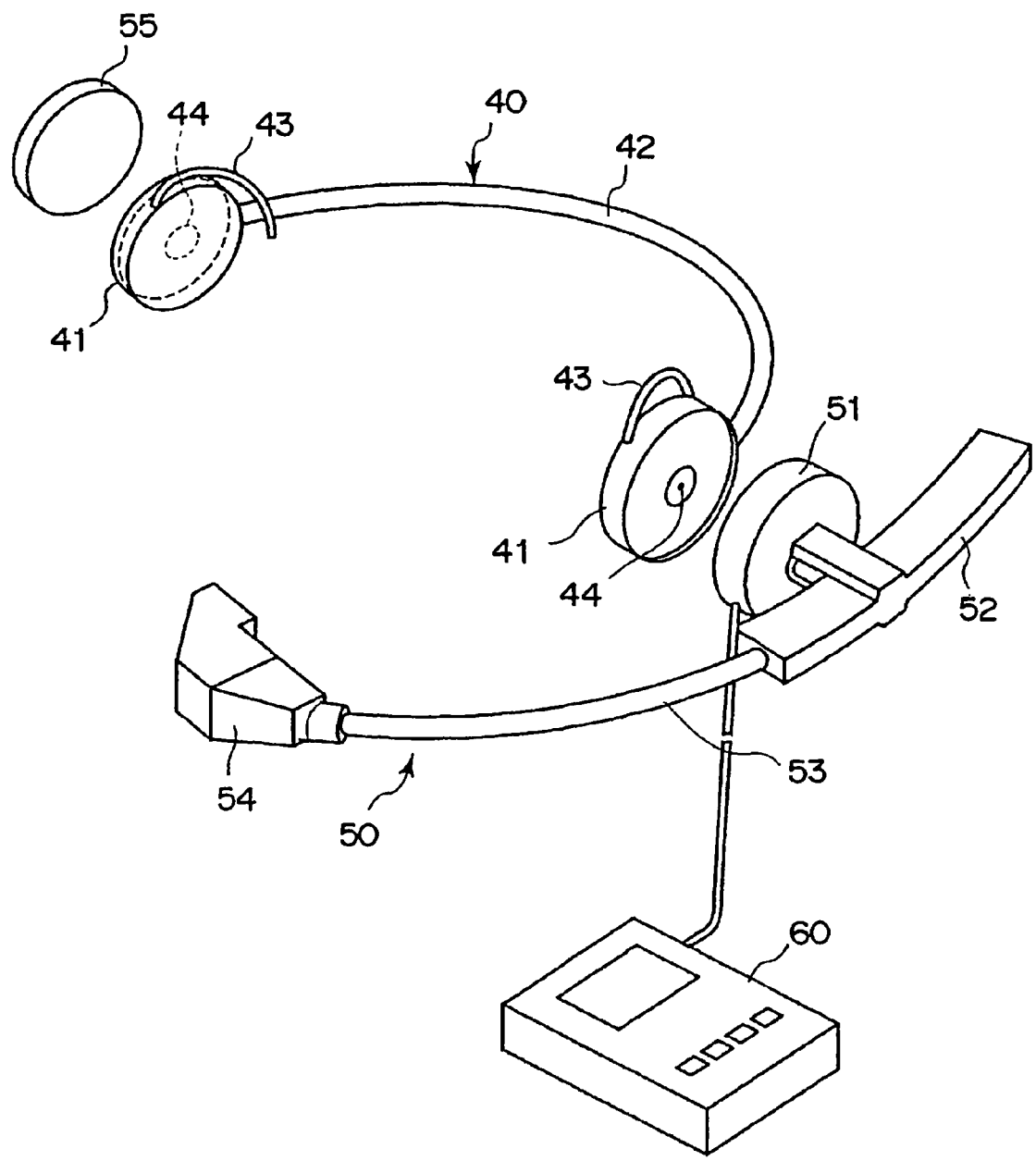
FIG. 13 is a schematic diagram of a head-mounted display using a diffractive optical element.
Figure 14:
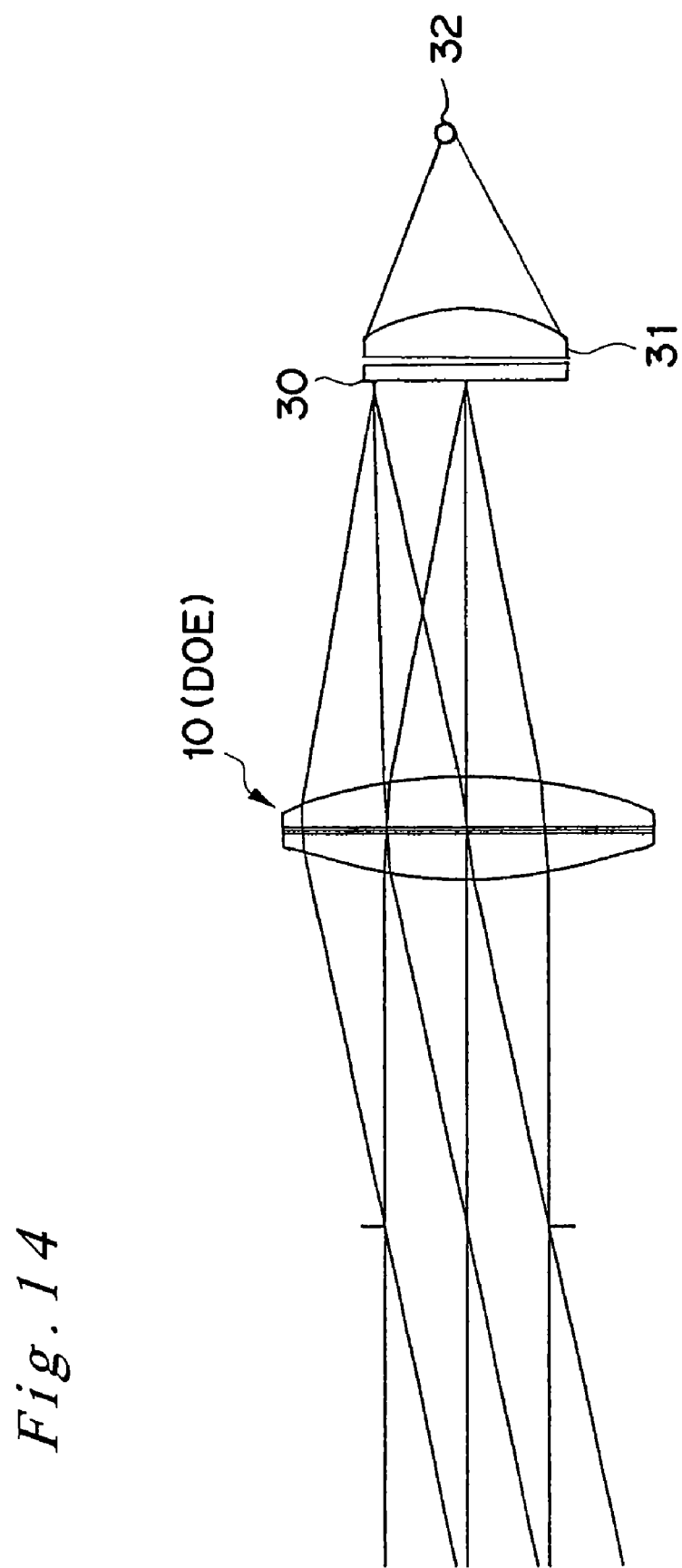
FIG. 14 is a schematic arrangement diagram of optical components comprised in a display of the head-mounted display of FIG. 13.

As illustrated in FIG. 13, the display 54 is supported by a cantilever structure of the display arm 53. The display 54 is thus required to be small and lightweight. However, this sacrifices image quality, which detracts from the value of the product, and hence an optical system such as the one illustrated in FIG. 14 is provided inside the display 54. The optical system provided inside the display 54 comprises a liquid crystal display element 30, the diffractive optical element 10 for forming a virtual image of the projected image of the liquid crystal display element 30, a backlight 32 for illuminating the liquid crystal display element 30, and an illumination optical element 31 for condensing and diffusing the light of the backlight 32. On the side of the backlight 32, the illumination optical element 31 has formed thereon a lens surface for condensing the light from the backlight 32, while on the side of the liquid crystal display element 30, the illumination optical element 31 has formed thereon a ground glass-like or microlens array-like diffusing surface. Such a constitution homogenizes the illumination distribution of the liquid crystal display element 30. The lens surface may be shaped as a Fresnel lens.

The diffractive optical element 10 combines a light-condensing effect through refraction, and a diffractive effect, so that the chromatic aberration generated by refraction is cancelled by the diffraction effect. Accordingly, using the diffractive optical element 10 in the eyepiece of a head-mounted display such as the one described above allows supplying a high-quality projected image to the user, even during projection of a full-color projected image. Also, the display 54 can be made smaller and lighter by constituting an eyepiece optical system using one optical component, as illustrated in FIG. 14.

In these examples, a diffractive optical element comprising three components may also be obtained by forming integrally the third optical element component L1 and the first optical element component L3 using for instance a polycarbonate resin and/or acrylic resin having virtually the same refractive index as the high-refractive index resin No. 1 or the high-refractive index resin No. 2, forming a relief pattern, and a lens-shape on the surface opposing the relief pattern forming surface, applying the low-refractive index resin No. 2 on the relief pattern forming surface, and then sandwiching the low-refractive index resin No. 2 with the fourth optical element component L2.

The eyepiece optical system illustrated in the above examples comprises only the diffractive optical element 10, but it is not limited thereto, and other optical elements may be arranged as well in the eyepiece optical system. Although in terms of weight this is somewhat detrimental, the refractive power and/or the diffraction effect per surface can be made smaller in proportion to the increase in diffraction surfaces and/or refraction surfaces, which in turn allows increasing tolerances in optical axis alignment. It becomes then possible to obtain an eyepiece optical system having good chromatic aberration correction even without using a lens barrel having an accurate optical element supporting structure.

The present invention is not limited to the above embodiments, and suitable improvements may be made without departing from the spirit and scope of the invention.

What is claimed is:

1. A diffractive optical element, comprising:
    a first optical element component on which a relief pattern for generating a desired diffraction effect is formed;
    a second optical element component bonded to a surface of said first optical element component on which said relief pattern is formed;
    a third optical element component bonded to a surface of said first optical element component opposite the surface on which said second optical element component is bonded to said first optical element component; and
    a fourth optical element component bonded to a surface of said second optical element component opposite the surface on which said second optical element component is bonded to said relief pattern of said first optical element component;
    wherein
    said first and second optical element components comprise a relatively high refractive index and low dispersion material, and a relatively low refractive index and high dispersion material, respectively; and
    said third and fourth optical element components are refractive lenses having curved surface shape of positive refractive power at surfaces that interface with the environment.

2. The diffractive optical element as claimed in claim 1, satisfying the condition:

$$L<dx$$

wherein L is the optical length difference, along the optical axis direction, of the most phase-advanced and most phase-delayed portions of a wavefront after diffraction of a light beam passing through said relief pattern, and dx is the thickness of one of the first or second optical element components positioned at the exit of said relief pattern.

3. The diffractive optical element as claimed in claim 2, satisfying the condition:

$$(d3+d4)/d<0.5$$

wherein d3 is the thickness of said first optical element component along the optical axis, d4 is the thickness of said second optical element component along the optical axis, and d is the sum of the thicknesses along the optical axis of said first, second, third and fourth optical element components.

4. The diffractive optical element as claimed in claim 1, satisfying the condition:

$$0.00001<P/f<0.03$$

wherein P is the minimum pitch of said relief pattern and f is the focal distance of the diffractive optical element.

5. The diffractive optical element as claimed in claim 1, satisfying the condition:

$$1.0<fd/(f1 \cdot f2)1/2<20.0$$

wherein f1 is the focal distance of said third optical element component, f2 is the focal distance of said fourth optical element component and fd is the inverse of the refractive power (focal distance) of said relief pattern.

6. The diffractive optical element as claimed in claim 1, further satisfying the condition:

$$0.03<|\{(nd3-1)/vd3-(nd4-1)/vd4\}/(nd3-nd4)|<3.0$$

wherein nd3 is the d-line refractive index of said first optical element component, nd4 is the d-line refractive index of said second optical element component, vd3 is the d-line Abbe number of said first optical element component and vd4 is the d-line Abbe number of said second optical element component.

7. The diffractive optical element as claimed in claim 1, wherein the optical material forming said third optical element component comprises a refractive index that is closer to that of an optical material of the optical element component to be formed later, than to that of an optical material of the optical element component to be formed first, among said first and second optical element components.

8. The diffractive optical element as claimed in claim 1, wherein
the optical material forming said third and fourth optical element components is a resin, and
the optical materials forming said first and second optical element components are UV-curable resins having mutually different refractive indices.

9. The diffractive optical element as claimed in claim 1, wherein said third or fourth optical element components comprise the same resin material.

10. The diffractive optical element as claimed in claim 1, wherein
the surface closest to an object side and the surface closest to an image side have predetermined curvatures respectively,
surfaces other than these surfaces have flat surfaces perpendicular to the optical axis, and
said relief pattern is planarly formed perpendicular to the optical axis.

11. An eyepiece optical system for forming a virtual image, comprising a diffractive optical element, said diffractive optical element including:
a first optical element component on which a relief pattern for generating a desired diffraction effect is formed;
a second optical element component bonded to a surface of said first optical element component on which said relief pattern is formed; and
a third optical element component bonded to a surface of said first optical element component opposite the surface on which said second optical element component is bonded to said first optical element component; and
a fourth optical element component bonded to a surface of said second optical element component opposite the surface on which said second optical element component is bonded to said relief pattern of said first optical element component;
wherein
said first and second optical element components comprise a relatively high refractive index and low dispersion material, and a relatively low refractive index and high dispersion material, respectively; and
said third and fourth optical element components are refractive lenses having curved surface shape of positive refractive power at surfaces that interface with the environment.

12. A diffractive optical element, comprising:
a first optical element component on which a relief pattern for generating a desired diffraction effect is formed;
a second optical element component bonded to a surface of said first optical element component on which said relief pattern is formed; and
a third optical element component bonded to a surface of said first optical element component opposite the surface on which said second optical element component is bonded to said first optical element component,
wherein
said first and second optical element components comprise a relatively high refractive index and low dispersion material, and a relatively low refractive index and high dispersion material, respectively; and
said third optical element component has a flat surface on the side where it is bonded to said first optical element component and a curved surface on a side where it interfaces with the environment.

13. The diffractive optical element as claimed in claim 12, further comprising a fourth optical element component bonded to a surface of said second optical element component opposite the surface on which said second optical element component is bonded to said relief pattern of said first optical element component.

14. The diffractive optical element as claimed in claim 13, wherein said third and fourth optical element components are refractive lenses having curved surface shape of positive refractive power at surfaces that interface with the environment.

15. The diffractive optical element as claimed in claim 14, satisfying the condition:

$$L<dx$$

wherein L is the optical length difference, along the optical axis direction, of the most phase-advanced and most phase-delayed portions of a wavefront after diffraction of a light beam passing through said relief pattern, and dx is the thickness of one of the first or second optical element components positioned at the exit of said relief pattern.

16. The diffractive optical element as claimed in claim 15, satisfying the condition:

$$(d3+d4)/d<0.5$$

wherein d3 is the thickness of said first optical element component along the optical axis, d4 is the thickness of said second optical element component along the optical axis, and d is the sum of the thicknesses along the optical axis of said first, second, third and fourth optical element components.

17. The diffractive optical element as claimed in claim 14, satisfying the condition: $0.00001<P/f<0.03$
wherein P is the minimum pitch of said relief pattern and f is the focal distance of the diffractive optical element.

18. The diffractive optical element as claimed in claim 14, satisfying the condition:

$$1.0<fd/(f1\cdot f2)1/2<20.0$$

wherein f1 is the focal distance of said third optical element component, f2 is the focal distance of said fourth optical element component and fd is the inverse of the refractive power (focal distance) of said relief pattern.

19. The diffractive optical element as claimed in claim 14, further satisfying the condition:

$$0.03<|\{(nd3-1)/vd3-(nd4-1)/vd4\}/(nd3-nd4)|<3.0$$

wherein nd3 is the d-line refractive index of said first optical element component, nd4 is the d-line refractive index of said second optical element component, vd3 is the d-line Abbe number of said first optical element component and vd4 is the d-line Abbe number of said second optical element component.

20. The diffractive optical element as claimed in claim 14, wherein the optical material forming said third optical element component comprises a refractive index that is closer to that of an optical material of the optical element component to be formed later, than to that of an optical material of the optical element component to be formed first, among said first and second optical element components.

21. The diffractive optical element as claimed in claim 14, wherein
the optical material forming said third and fourth optical element components is a resin, and
the optical materials forming said first and second optical element components are UV-curable resins having mutually different refractive indices.

22. The diffractive optical element as claimed in claim 14, wherein said third or fourth optical element components comprise the same resin material.

23. The diffractive optical element as claimed in claim 14, wherein
the surface closest to an object side and the surface closest to an image side have predetermined curvatures respectively,
surfaces other than these surfaces have flat surfaces perpendicular to the optical axis, and
said relief pattern is planarly formed perpendicular to the optical axis.

24. A diffractive optical element, comprising:
a first optical element component on which a relief pattern for generating a desired diffraction effect is formed;
a second optical element component bonded to a surface of said first optical element component on which said relief pattern is formed;
a third optical element component bonded to a surface of said first optical element component opposite the surface on which said second optical element component is bonded to said first optical element component; and
a fourth optical element component bonded to a surface of said second optical element component opposite the surface on which said second optical element component is bonded to said relief pattern of said first optical element component;
wherein
said first and second optical element components comprise a relatively high refractive index and low dispersion material, and a relatively low refractive index and high dispersion material, respectively; and
the diffractive optical element satisfies the condition:

$(d3+d4)/d<0.5$ wherein d3 is the thickness of said first optical element component along the optical axis, d4 is the thickness of said second optical element component along the optical axis, and d is the sum of the thicknesses along the optical axis of said first, second, third and fourth optical element components.

25. The diffractive optical element as claimed in claim 24, satisfying the condition:

$L<dx$ wherein L is the optical length difference, along the optical axis direction, of the most phase-advanced and most phase-delayed portions of a wavefront after diffraction of a light beam passing through said relief pattern, and dx is the thickness of one of the first or second optical element components positioned at the exit of said relief pattern.

26. The diffractive optical element as claimed in claim 24, satisfying the condition:

$0.00001<P/f<0.03$ wherein P is the minimum pitch of said relief pattern and f is the focal distance of the diffractive optical element.

27. The diffractive optical element as claimed in claim 24, satisfying the condition: $1.0<fd/(f1 \cdot f2)1/2<20.0$
wherein f1 is the focal distance of said third optical element component, f2 is the focal distance of said fourth optical element component and fd is the inverse of the refractive power (focal distance) of said relief pattern.

28. The diffractive optical element as claimed in claim 24, further satisfying the condition:

$0.03<|\{(nd3-1)/vd3-(nd4-1)/vd4\}/(nd3-nd4)|<3.0$ wherein nd3 is the d-line refractive index of said first optical element component, nd4 is the d-line refractive index of said second optical element component, vd3 is the d-line Abbe number of said first optical element component and vd4 is the d-line Abbe number of said second optical element component.

29. The diffractive optical element as claimed in claim 24, wherein the optical material forming said third optical element component comprises a refractive index that is closer to that of an optical material of the optical element component to be formed later, than to that of an optical material of the optical element component to be formed first, among said first and second optical element components.

30. The diffractive optical element as claimed in claim 24, wherein
the optical material forming said third and fourth optical element components is a resin, and
the optical materials forming said first and second optical element components are UV-curable resins having mutually different refractive indices.

31. The diffractive optical element as claimed in claim 24, wherein said third or fourth optical element components comprise the same resin material.

32. The diffractive optical element as claimed in claim 24, wherein
the surface closest to an object side and the surface closest to an image side have predetermined curvatures respectively,
surfaces other than these surfaces have flat surfaces perpendicular to the optical axis, and
said relief pattern is planarly formed perpendicular to the optical axis.

33. An eyepiece optical system for forming a virtual image, comprising a diffractive optical element, said diffractive optical element including:
a first optical element component on which a relief pattern for generating a desired diffraction effect is formed;
a second optical element component bonded to a surface of said first optical element component on which said relief pattern is formed;
a third optical element component bonded to a surface of said first optical element component opposite the surface on which said second optical element component is bonded to said first optical element component; and a fourth optical element component bonded to a surface of said second optical component opposite the surface on which said second optical element component is bonded to said relief pattern of said first optical element component;

wherein said first and second optical element components comprise a relatively high refractive index and low dispersion material, and a relatively low refractive index and high dispersion material, respectively; and said diffractive optical element satisfies the condition:

$$(d3+d4)/d<0.5$$

wherein $d3$ is the thickness of said first optical element component along the optical axis, $d4$ is the thickness of said second optical element component along the optical axis, and d is the sum of the thicknesses along the optical axis of said first, second, third and fourth optical element components.

* * * * *